US012393381B2

(12) United States Patent
Yamamichi

(10) Patent No.: US 12,393,381 B2
(45) Date of Patent: Aug. 19, 2025

(54) INFORMATION PROCESSING APPARATUS, METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Masaki Yamamichi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 47 days.

(21) Appl. No.: 18/485,488

(22) Filed: Oct. 12, 2023

(65) Prior Publication Data

US 2024/0134584 A1 Apr. 25, 2024
US 2024/0231722 A9 Jul. 11, 2024

(30) Foreign Application Priority Data

Oct. 21, 2022 (JP) .................................. 2022-169398

(51) Int. Cl.
*G06F 3/12* (2006.01)

(52) U.S. Cl.
CPC .......... *G06F 3/1254* (2013.01); *G06F 3/1204* (2013.01); *G06F 3/1255* (2013.01); *G06F 3/1288* (2013.01)

(58) Field of Classification Search
None
See application file for complete search history.

(56) References Cited

U.S. PATENT DOCUMENTS

2014/0002836 A1* 1/2014 Ishino ................... G06F 3/1298
358/1.13
2021/0240412 A1* 8/2021 Saigusa ................. G06F 3/1288

FOREIGN PATENT DOCUMENTS

JP 2021124791 A1 8/2021

* cited by examiner

*Primary Examiner* — Frantz Bataille
(74) *Attorney, Agent, or Firm* — ROSSI, KIMMS & McDOWELL LLP

(57) ABSTRACT

An information processing apparatus includes an application which extends a function of a driver supporting a cloud print service. The application includes: a first acquisition unit which acquires capability information of a printer corresponding to the driver from the cloud print service if printing via the driver is performed; a display unit which displays a setting screen corresponding to the capability information based on the capability information acquired by the first acquisition unit; a second acquisition unit which acquires intermediate data generated by software different from the application based on setting information of the setting screen; and a conversion unit which converts the intermediate data acquired by the second acquisition unit into data to be transmitted to the cloud print service.

19 Claims, 23 Drawing Sheets

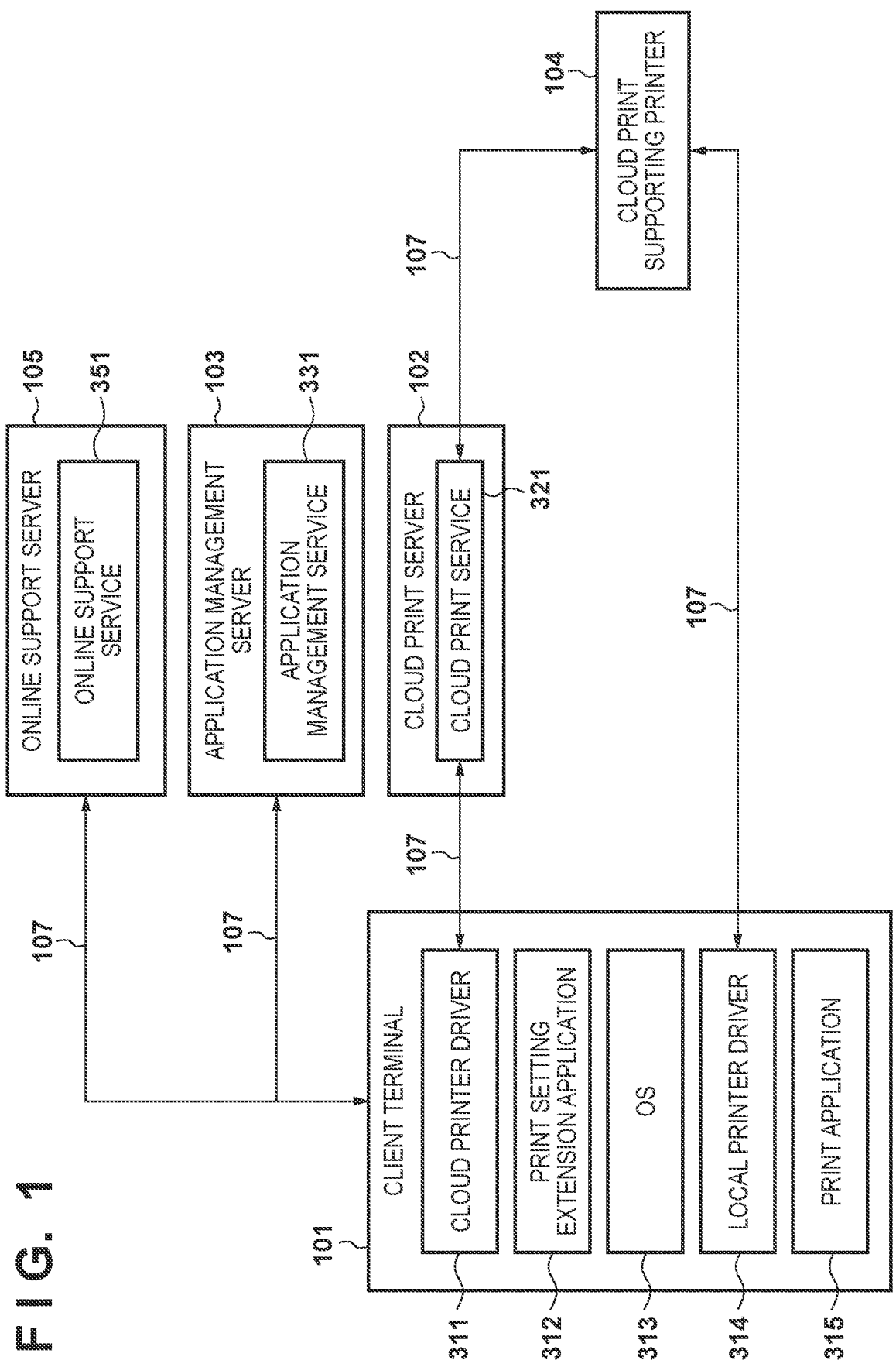

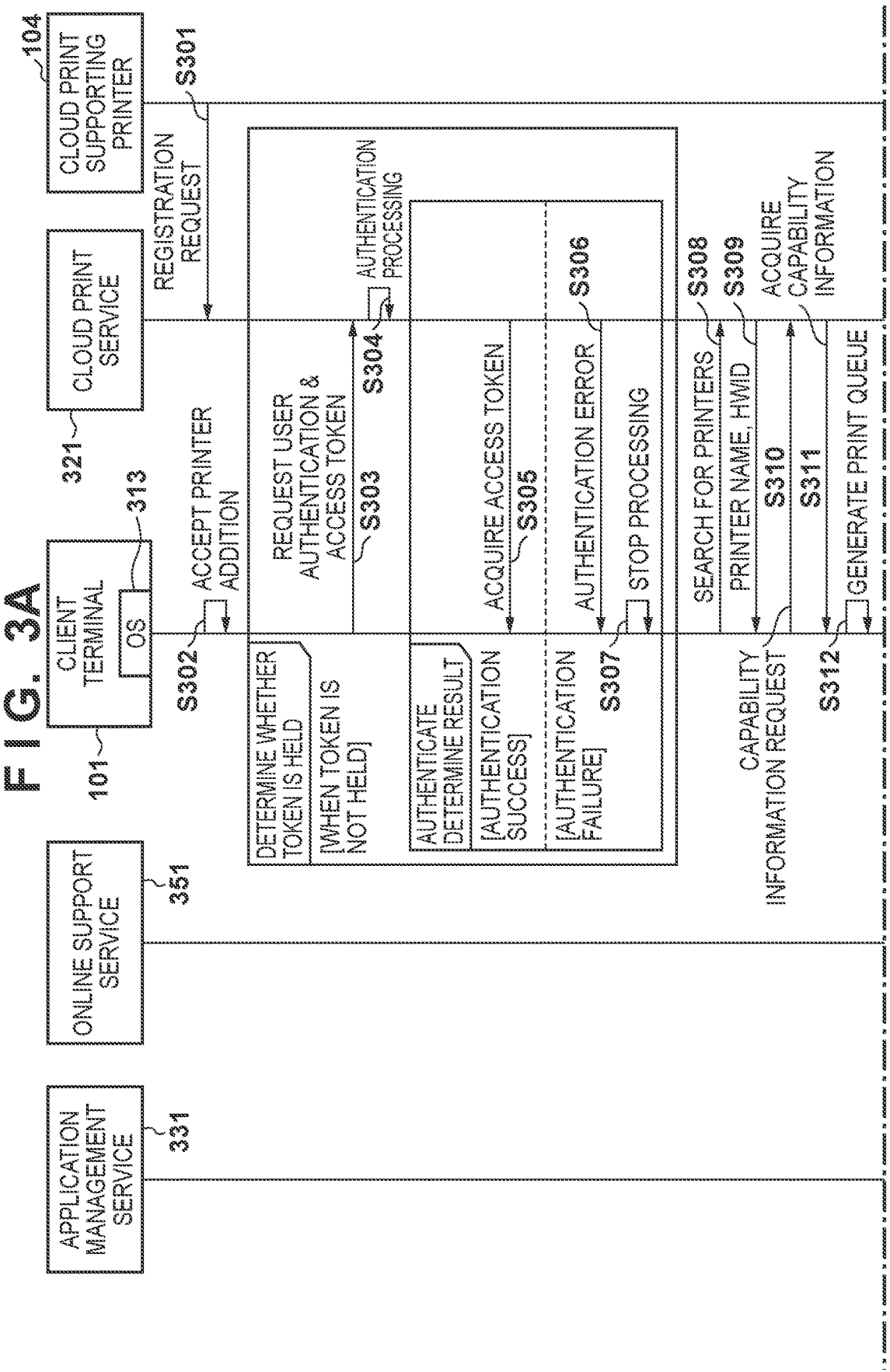

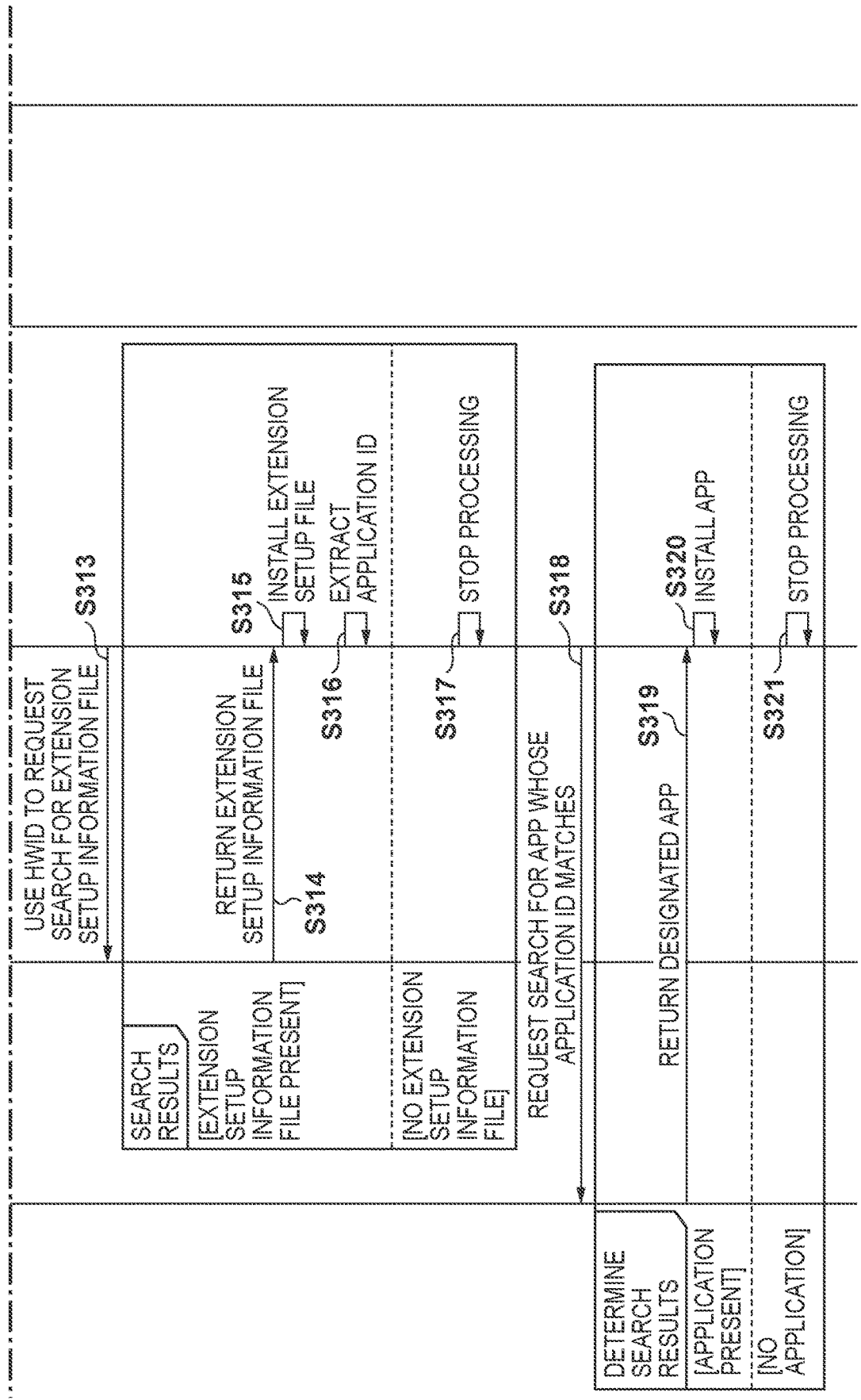

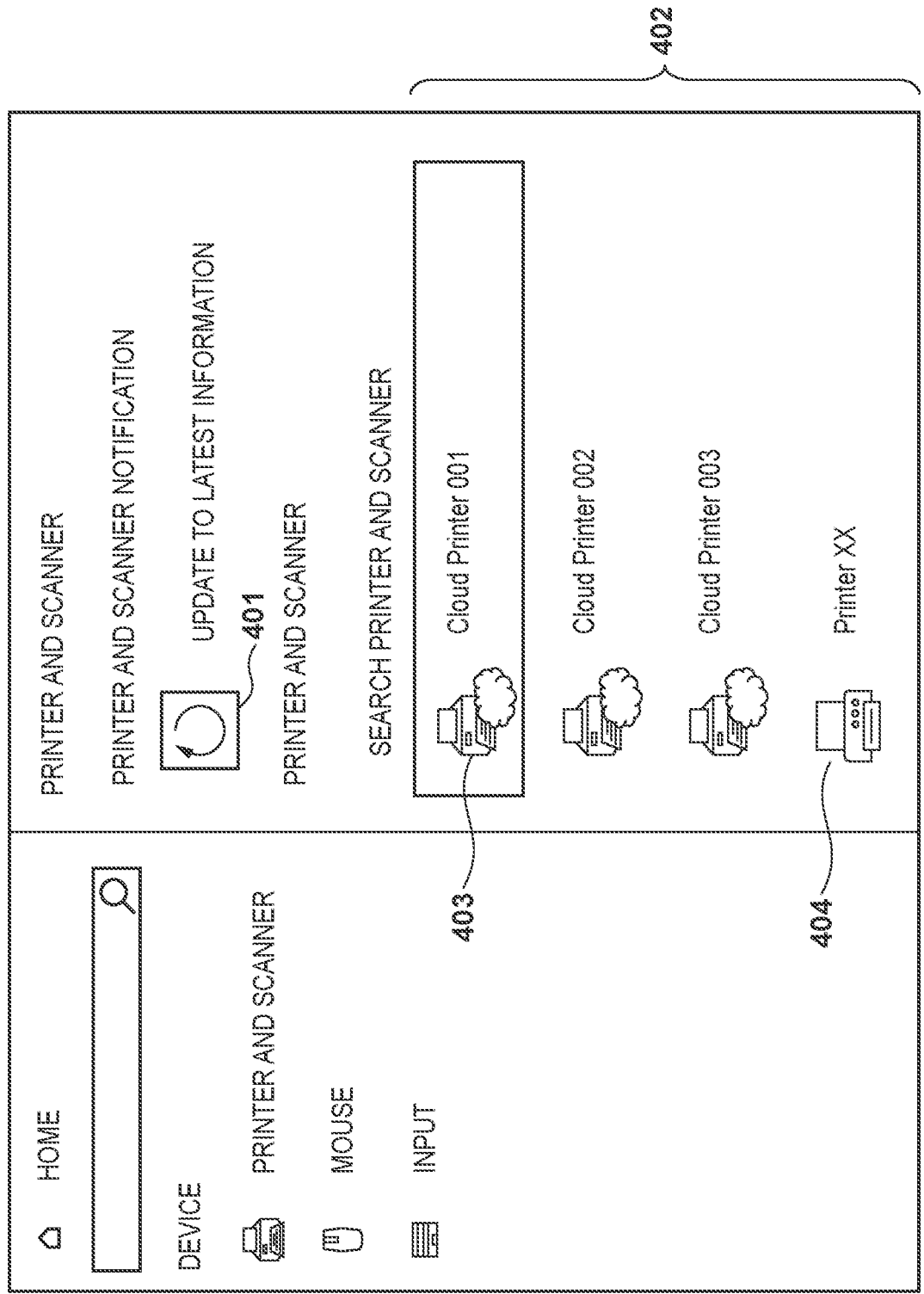

FIG. 5

| | |
|---|---|
| TYPE OF PAPER | ENVELOPE/LABEL/PLAIN PAPER/PHOTO /PHOTO PAPER GLOSSY STANDARD /PHOTO PAPER MATTE/INK JET POSTCARD (COMMUNICATE) /INK JET POSTCARD (ADDRESS SIDE)/INK JET POSTCARD (COMMUNICATE) /INK JET PICTURE POSTCARD (ADDRESS SIDE) |
| NUMBER OF COPIES | Max=99 |
| ORIENTATION OF PAPER | VERTICAL/HORIZONTAL |
| PRINT QUALITY | STANDARD/DRAFT |
| PRINT ON A COPY BASIS | ON/OFF |
| STAPLE | NONE/AUTO/UPPER LEFT/LOWER LEFT/UPPER RIGHT/LOWER RIGHT /LEFT EDGE (BINDING AT 2 LOCATIONS)/UPPER EDGE (BINDING AT 2 LOCATIONS) /RIGHT EDGE (BINDING AT 2 LOCATIONS)/LOWER EDGE (BINDING AT 2 LOCATIONS) /SADDLE STITCH BINDING/STAPLELESS BINDING |
| MULTIPLE DOCUMENT HANDLING | ONLY ONE/ON DOCUMENT BASIS |
| MAXIMUM NUMBER OF DOCUMENT DIVISIONS | Max=50 |
| PUNCHING | NONE/PUNCH HOLES (AUTO)/PUNCH HOLES (2 HOLES LEFT)/PUNCH HOLES (3 HOLES LEFT) /PUNCH HOLES (4 HOLES LEFT)/PUNCH HOLES (MULTI LEFT)/PUNCH HOLES (2 HOLES RIGHT) /PUNCH HOLES (3 HOLES RIGHT)/PUNCH HOLES (4 HOLES RIGHT)/PUNCH HOLES (MULTI RIGHT) /PUNCH HOLES (2 HOLES TOP)/PUNCH HOLES (3 HOLES TOP)/PUNCH HOLES (4 HOLES TOP) /PUNCH HOLES (MULTI TOP)/PUNCH HOLES (2 HOLES BOTTOM)/PUNCH HOLES (3 HOLES BOTTOM) /PUNCH HOLES (4 HOLES BOTTOM)/PUNCH HOLES (MULTI BOTTOM) |
| FOLDING SETTING | NONE/FOLDED IN TWO/C FOLD/QUARTO FOLD/OUTER TRI-FOLD/Z FOLD /SADDLE FOLDING (OUTPUT FROM SADDLE FINISHER) |
| COLOR MODE | COLOR/MONOCHROME |
| PAGE AGGREGATION | OFF/2in1/4in1/6in1/9in1/16in1 |
| ARRANGEMENT ORDER | LEFT TO RIGHT/RIGHT TO LEFT |
| SCALING FACTOR | NONE/ALIGN TO PAGE WIDTH/ALIGN TO SCREEN SIZE |
| DOUBLE-SIDED PRINTING | SINGLE-SIDED/DOUBLE-SIDED |
| BINDING DIRECTION | LONG-SIDE BINDING/SHORT-SIDE BINDING |
| 180 DEGREE ROTATION | NONE/COUNTERCLOCKWISE/CLOCKWISE |
| SAVE JOB IN PRINTER | ON/OFF |
| ABBREVIATE JOB NAME | ON/OFF |
| SWITCH LANGUAGE | Japanese/English/French/German/Italian/Spanish/Portuguese/ Dutch/Danish/Norwegian/Swedish/Finnish/Polish/ Czech/ Russian/Turkish/Chinese(Simplified)/Chinese(Traditional)/Korean/ Thai/Indonesian |

F I G. 6A

```
<?xml version="1.0" encoding="utf-8"?>
<PrintDeviceCapabilities
 xmlns:xsi="http://www.w3.org/2001/XMLSchema-instance"
 xmlns:xsd="http://www.w3.org/2001/XMLSchema"
 xmlns:xml="http://www.w3.org/XML/1998/namespace"
 xmlns:psk="http://schemas.microsoft.com/windows/2003/08/printing/printschemakeywords"
 xmlns:psk12="http://schemas.microsoft.com/windows/2013/12/printing/printschemakeywordsv12"
 xmlns:psf="http://schemas.microsoft.com/windows/2003/08/printing/printschemaframework"
 xmlns:psf2="http://schemas.microsoft.com/windows/2013/12/printing/printschemaframework2"
 xmlns="http://schemas.microsoft.com/windows/2013/12/printing/printschemaframework2"
 version="2">

<psk:JobCopiesAllDocuments psf2:psftype="ParameterDef">
  <psf:DataType xsi:type="xsd:QName" psf2:psftype="Property">xsd:integer</psf:DataType>
  <psf:DefaultValue xsi:type="xsd:integer" psf2:psftype="Property">1</psf:DefaultValue>
  <psf:Mandatory xsi:type="xsd:QName" psf2:psftype="Property">psk:Unconditional</psf:Mandatory>
  <psf:MaxValue xsi:type="xsd:integer" psf2:psftype="Property">999</psf:MaxValue>
  <psf:MinValue xsi:type="xsd:integer" psf2:psftype="Property">1</psf:MinValue>
  <psf:Multiple xsi:type="xsd:integer" psf2:psftype="Property">1</psf:Multiple>
  <psf:UnitType xsi:type="xsd:string" psf2:psftype="Property">copies</psf:UnitType>
</psk:JobCopiesAllDocuments>
```

F I G. 6B

```xml
<pskPageMediaSize psf2:psftype="Feature">
  <pskISOA4 psf2:psftype="Option">
    <psk12:PortraitImageableSize xsi:type="psf2:ImageableAreaType" psf2:psftype="Property">12700,12700,184600,271600</psk12:PortraitImageableSize>
    <pskMediaSizeHeight xsi:type="xsd:integer" psf2:psftype="ScoredProperty">297000</pskMediaSizeHeight>
    <pskMediaSizeWidth xsi:type="xsd:integer" psf2:psftype="ScoredProperty">210000</pskMediaSizeWidth>
  </pskISOA4>
  <pskNorthAmericaLetter psf2:psftype="Option" psf2:default="true">
    <psk12:PortraitImageableSize xsi:type="psf2:ImageableAreaType" psf2:psftype="Property">12700,12700,190500,254000</psk12:PortraitImageableSize>
    <pskMediaSizeHeight xsi:type="xsd:integer" psf2:psftype="ScoredProperty">279400</pskMediaSizeHeight>
    <pskMediaSizeWidth xsi:type="xsd:integer" psf2:psftype="ScoredProperty">215900</pskMediaSizeWidth>
  </pskNorthAmericaLetter>
</pskPageMediaSize>

<pskPageOrientation psf2:psftype="Feature">
  <pskLandscape psf2:psftype="Option" />
  <pskPortrait psf2:psftype="Option" psf2:default="true" />
</pskPageOrientation>
....................

<pskPageOutputColor psf2:psftype="Feature">
  <pskColor psf2:psftype="Option" psf2:default="true">
    <pskDeviceBitsPerPixel xsi:type="xsd:integer" psf2:psftype="ScoredProperty">24</pskDeviceBitsPerPixel>
    <pskDriverBitsPerPixel xsi:type="xsd:integer" psf2:psftype="ScoredProperty">24</pskDriverBitsPerPixel>
  </pskColor>
</pskPageOutputColor>
</PrintDeviceCapabilities>
```

F I G. 7A

```xml
<?xml version="1.0" encoding="UTF-8"?>
<PrintDeviceCapabilities
xmlns:ns0000="http://schemas.microsoft.com/windows/2018/04/printing/printschemakeywords/Ipp"
xmlns:xsi="http://www.w3.org/2001/XMLSchema-instance"
xmlns:xsd="http://www.w3.org/2001/XMLSchema"
xmlns:xml="http://www.w3.org/XML/1998/namespace"
xmlns:psk="http://schemas.microsoft.com/windows/2003/08/printing/printschemakeywords"
xmlns:psk11="http://schemas.microsoft.com/windows/2013/05/printing/printschemakeywordsv11"
xmlns:psk12="http://schemas.microsoft.com/windows/2013/12/printing/printschemakeywordsv12"
xmlns:psf="http://schemas.microsoft.com/windows/2003/08/printing/printschemaframework"
xmlns:psf2="http://schemas.microsoft.com/windows/2013/12/printing/printschemaframework2"
xmlns="http://schemas.microsoft.com/windows/2013/12/printing/printschemaframework2"
version="2">
<!-- copies-default, copies-supported -->
<psk:JobCopiesAllDocuments psf2:psftype="Property" xsi:type="ParameterDef">
  <psf:DataType psf2:psftype="Property" xsi:type="xsd:QName">xsd:integer</psf:DataType>
  <psf:DefaultValue psf2:psftype="Property" xsi:type="xsd:integer">1</psf:DefaultValue>
  <psf:Mandatory psf2:psftype="Property" xsi:type="xsd:QName">psk:Unconditional</psf:Mandatory>
  <psf:MinValue psf2:psftype="Property" xsi:type="xsd:integer">1</psf:MinValue>
  <psf:MaxValue psf2:psftype="Property" xsi:type="xsd:integer">99</psf:MaxValue>
  <psf:Multiple psf2:psftype="Property" xsi:type="xsd:integer">1</psf:Multiple>
  <psf:UnitType psf2:psftype="Property" xsi:type="xsd:string">copies</psf:UnitType>
</psk:JobCopiesAllDocuments>
```

F I G. 7B

```
<!-- media-default, media-supported, media-col-database -->
<psk:PageMediaSize psf2:psftype="Feature">
  <psk:JapanHagakiPostcard psf2:psftype="Option" psf2:default="false">
    <psk:MediaSizeWidth xsi:type="xsd:integer" psf2:psftype="ScoredProperty" psf2:ImageableAreaType xsi:type="psf2:ImageableAreaSize" psf2:psftype="Property">100000</psk:MediaSizeWidth>
    <psk:MediaSizeHeight xsi:type="xsd:integer" psf2:psftype="ScoredProperty" psf2:ImageableAreaType xsi:type="psf2:ImageableAreaSize" psf2:psftype="Property">148000</psk:MediaSizeHeight>
    <psk12:PortraitImageableSize xsi:type="psf2:ImageableAreaType" psf2:psftype="Property">3400,5000,93200,138000</psk12:PortraitImageableSize>
    <psk12:BorderlessImageableSize xsi:type="psf2:ImageableAreaType" psf2:psftype="Property">0,0,100000,148000</psk12:BorderlessImageableSize>
  </psk:JapanHagakiPostcard>
  <psk:ISOA5 psf2:psftype="Option" psf2:default="false">
    <psk:MediaSizeWidth xsi:type="xsd:integer" psf2:psftype="ScoredProperty" psf2:ImageableAreaType xsi:type="psf2:ImageableAreaSize" psf2:psftype="Property">148000</psk:MediaSizeWidth>
    <psk:MediaSizeHeight xsi:type="xsd:integer" psf2:psftype="ScoredProperty" psf2:ImageableAreaType xsi:type="psf2:ImageableAreaSize" psf2:psftype="Property">210000</psk:MediaSizeHeight>
    <psk12:PortraitImageableSize xsi:type="psf2:ImageableAreaType" psf2:psftype="Property">3400,5000,141200,200000</psk12:PortraitImageableSize>
    <psk12:BorderlessImageableSize xsi:type="psf2:ImageableAreaType" psf2:psftype="Property">0,0,148000,210000</psk12:BorderlessImageableSize>
  </psk:ISOA5>
  <psk:ISOA4 psf2:psftype="Option" psf2:default="false">
    <psk:MediaSizeWidth xsi:type="xsd:integer" psf2:psftype="ScoredProperty" psf2:ImageableAreaType xsi:type="psf2:ImageableAreaSize" psf2:psftype="Property">210000</psk:MediaSizeWidth>
    <psk:MediaSizeHeight xsi:type="xsd:integer" psf2:psftype="ScoredProperty" psf2:ImageableAreaType xsi:type="psf2:ImageableAreaSize" psf2:psftype="Property">297000</psk:MediaSizeHeight>
    <psk12:PortraitImageableSize xsi:type="psf2:ImageableAreaType" psf2:psftype="Property">3400,5000,203200,287000</psk12:PortraitImageableSize>
    <psk12:BorderlessImageableSize xsi:type="psf2:ImageableAreaType" psf2:psftype="Property">0,0,210000,297000</psk12:BorderlessImageableSize>
  </psk:ISOA4>
  <psk:NorthAmericaLetter psf2:psftype="Option" psf2:default="true">
    <psk:MediaSizeWidth xsi:type="xsd:integer" psf2:psftype="ScoredProperty" psf2:ImageableAreaType xsi:type="psf2:ImageableAreaSize" psf2:psftype="Property">215900</psk:MediaSizeWidth>
    <psk:MediaSizeHeight xsi:type="xsd:integer" psf2:psftype="ScoredProperty" psf2:ImageableAreaType xsi:type="psf2:ImageableAreaSize" psf2:psftype="Property">279400</psk:MediaSizeHeight>
    <psk12:PortraitImageableSize xsi:type="psf2:ImageableAreaType" psf2:psftype="Property">6400,5000,203200,269400</psk12:PortraitImageableSize>
    <psk12:BorderlessImageableSize xsi:type="psf2:ImageableAreaType" psf2:psftype="Property">0,0,215900,279400</psk12:BorderlessImageableSize>
  </psk:NorthAmericaLetter>
  <psk:JapanYou4Envelope psf2:psftype="Option" psf2:default="false">
    <psk:MediaSizeWidth xsi:type="xsd:integer" psf2:psftype="ScoredProperty" psf2:ImageableAreaType xsi:type="psf2:ImageableAreaSize" psf2:psftype="Property">105000</psk:MediaSizeWidth>
    <psk:MediaSizeHeight xsi:type="xsd:integer" psf2:psftype="ScoredProperty" psf2:ImageableAreaType xsi:type="psf2:ImageableAreaSize" psf2:psftype="Property">235000</psk:MediaSizeHeight>
    <psk12:PortraitImageableSize xsi:type="psf2:ImageableAreaType" psf2:psftype="Property">5600,8000,93800,214300</psk12:PortraitImageableSize>
    <psk12:BorderlessImageableSize xsi:type="psf2:ImageableAreaType" psf2:psftype="Property">0,0,105000,235000</psk12:BorderlessImageableSize>
  </psk:JapanYou4Envelope>
  ..............
</psk:PageMediaSize>
```

FIG. 7C

```
<!-- orientation-requested-default -->
<psk:PageOrientation psf2:psftype="Feature">
  <psk:Portrait psf2:psftype="Option" psf2:default="true" />
  <psk:Landscape psf2:psftype="Option" psf2:default="false" />
  <psk:ReverseLandscape psf2:psftype="Option" psf2:default="false" />
</psk:PageOrientation>
......

<!-- finishings-default, finishings-supported -->
<psk:JobStapleAllDocuments psf2:psftype="Feature">
  <psk:None psf2:psftype="Option" psf2:default="true" />
  <psk:StapleTopLeft psf2:psftype="Option" psf2:default="false" />
  <psk:StapleTopRight psf2:psftype="Option" psf2:default="false" />
  <psk:StapleBottomLeft psf2:psftype="Option" psf2:default="false" />
  <psk:StapleBottomRight psf2:psftype="Option" psf2:default="false" />
  <psk:StapleDualLeft psf2:psftype="Option" psf2:default="false" />
  <psk:StapleDualTop psf2:psftype="Option" psf2:default="false" />
  <psk:StapleDualRight psf2:psftype="Option" psf2:default="false" />
  <psk:StapleDualBottom psf2:psftype="Option" psf2:default="false" />
  <psk:SaddleStitch psf2:psftype="Option" psf2:default="false" />
</psk:JobStapleAllDocuments>
```

FIG. 7D

```
<psk:DocumentStaple psf2:psftype="Feature">
  <psk:None psf2:psftype="Option" psf2:default="true"/>
  <psk:StapleTopLeft psf2:psftype="Option" psf2:default="false"/>
  <psk:StapleTopRight psf2:psftype="Option" psf2:default="false"/>
  <psk:StapleBottomLeft psf2:psftype="Option" psf2:default="false"/>
  <psk:StapleBottomRight psf2:psftype="Option" psf2:default="false"/>
  <psk:StapleDualLeft psf2:psftype="Option" psf2:default="false"/>
  <psk:StapleDualTop psf2:psftype="Option" psf2:default="false"/>
  <psk:StapleDualRight psf2:psftype="Option" psf2:default="false"/>
  <psk:StapleDualBottom psf2:psftype="Option" psf2:default="false"/>
  <psk:SaddleStitch psf2:psftype="Option" psf2:default="false"/>
</psk:DocumentStaple>
<ns0000:MultiBinderNumber psf2:psftype="ParameterDef">
  <psf:DataType xsi:type="xsd:QName" psf2:psftype="Property">xsd:integer</psf:DataType>
  <psf:DefaultValue xsi:type="xsd:integer" psf2:psftype="Property">1</psf:DefaultValue>
  <psf:Mandatory xsi:type="xsd:QName" psf2:psftype="Property">psk:Unconditional</psf:Mandatory>
  <psf:MaxValue xsi:type="xsd:integer" psf2:psftype="Property">50</psf:MaxValue>
  <psf:MinValue xsi:type="xsd:integer" psf2:psftype="Property">1</psf:MinValue>
  <psf:Multiple xsi:type="xsd:integer" psf2:psftype="Property">1</psf:Multiple>
</ns0000:MultiBinderNumber>

</PrintDeviceCapabilities>
```

FIG. 8

```
[Version]
Signature = "$WIN NT$"
Class = Extension
ClassGuid = {e2f84ce7-8efa-411c-aa69-97454ca4cb57}
Provider = %ManufacturerName%
ExtensionId = {D4D9196A-105B-4B76-B693-84BD33A7A703}
CatalogFile = App.cat
DriverVer = 08/19/2020,16.35.13.542

[Manufacturer]
%ManufacturerName% = Ms, NTamd64.6.3

[Microsoft.NTamd64.6.3]
%Device.ExtensionDesc% = App-Install, %PrinterHardwareId%
%Device.ExtensionDesc% = App-Install, %PrinterHardwareId2%
%Device.ExtensionDesc% = App-Install, %PrinterHardwareId3%

[App-Install.NT]
AddProperty = Add-App-Property

[App-Install.NT.Software]
AddSoftware = %SoftwareName%,, Ms-App-SoftwareInstall

[Microsoft-App-SoftwareInstall]
SoftwareType = %MsStoreType%
SoftwareID = pfn://%PackageFamilyName%

[Add-App-Property]
{A925764B-88E0-426D-AFC5-B39768BE59EB}, 1, 0x12,, %AUMID%

[Strings]
ManufacturerName = "Ms"
SoftwareName = "CPrintApp"
PackageFamilyName = "PrinterApp_aaaaaaaaaaa8a"
AUMID = "PrinterApp_aaaaaaaaaaa8a!App"
Device.ExtensionDesc = "PrintApp"
MsStoreType = 2
PrinterHardwareId = "PrinterApp_device001"
```

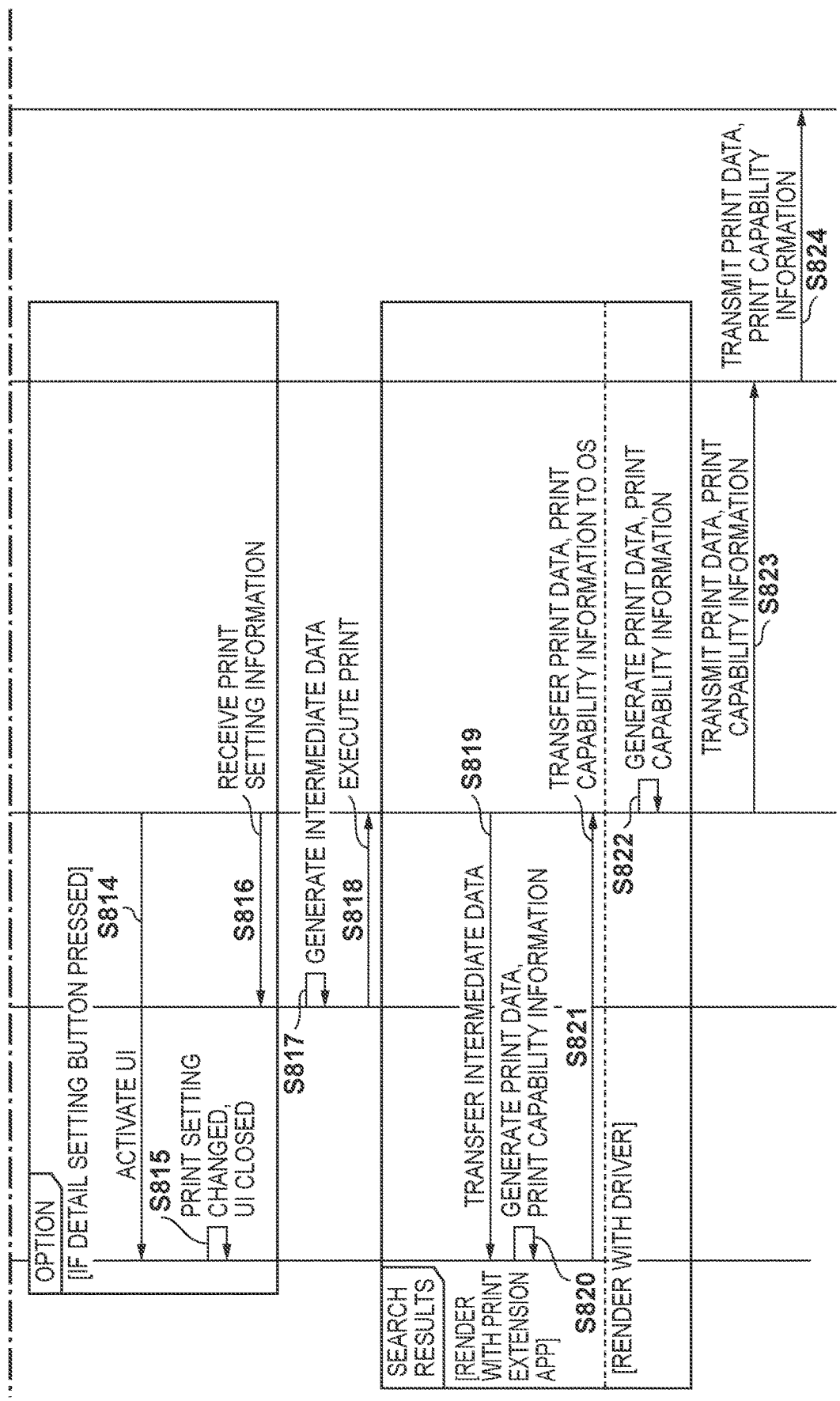

FIG. 10A

PRINT ORIENTATION
[VERTICAL ▼]
DOUBLE-SIDED PRINTING
[NONE ▼]
PAGE ORDER
[ORDER ▼]
PRINT QUALITY
[STANDARD ▼]
[ADVANCED SETTINGS] — 901

[OK] [CANCEL] [APPLY]
 905    904     903

FIG. 10B

PAPER SIZE
[A4 ▼]
NUMBER OF COPIES
[1 COPY ▼]
COLOR PRINT MODE
[COLOR ▼]
SHEET TYPE
[STANDARD ▼]

[OK] [CANCEL]
   902

FIG. 10C

BORDERLESS PRINTING
[NONE ▼]
RESOLUTION
[300dpi ▼]
SCALING
[NONE ▼]
STAPLING
[NONE ▼]

[OK] [CANCEL]

FIG. 10D

FOLDING SETTING
[NONE ▼]
PUNCHING
[NONE ▼]
DISCHARGE PORT
[AUTO ▼]
Nup
[2 ▼]

[OK] [CANCEL]

FIG. 11A

- OUTPUT PAPER SIZE: A4 ▼ —1001
- TYPE OF PAPER: PLAIN PAPER
- NUMBER OF COPIES: 1
- ORIENTATION OF PAPER: ● VERTICAL ○ HORIZONTAL
- PRINT QUALITY: STANDARD ▼

[ OK ] [ CANCEL ] —1002

FIG. 11B

- PRINT ON A COPY BASIS: OFF ▼
- STAPLE: UPPER LEFT ▼
- PUNCHING: NONE ▼
- FOLDING SETTING: NONE ▼
- COLOR MODE: COLOR ▼

[ OK ] [ CANCEL ]

FIG. 11C

- PAGE AGGREGATION: 2in1 ▼
- ARRANGEMENT ORDER: LEFT TO RIGHT ▼
- SCALING FACTOR: NONE ▼
- DOUBLE-SIDED PRINTING: NONE ▼
- BINDING DIRECTION: LONG-SIDE BINDING ▼

[ OK ] [ CANCEL ]

FIG. 11D

- 180 DEGREE ROTATION: NONE ▼
- SAVE JOB IN PRINTER: OFF ▼
- ABBREVIATE JOB NAME: OFF ▼

[ OK ] [ CANCEL ]

FIG. 11E

- 180 DEGREE ROTATION: NONE ▼
- SAVE JOB IN PRINTER: OFF ▼
- ABBREVIATE JOB NAME: ON ▼
- DELETE THE FOLLOWING CHARACTER STRING FROM FRONT OF JOB NAME: SAMPLE DOCUMENT

[ OK ] [ CANCEL ]

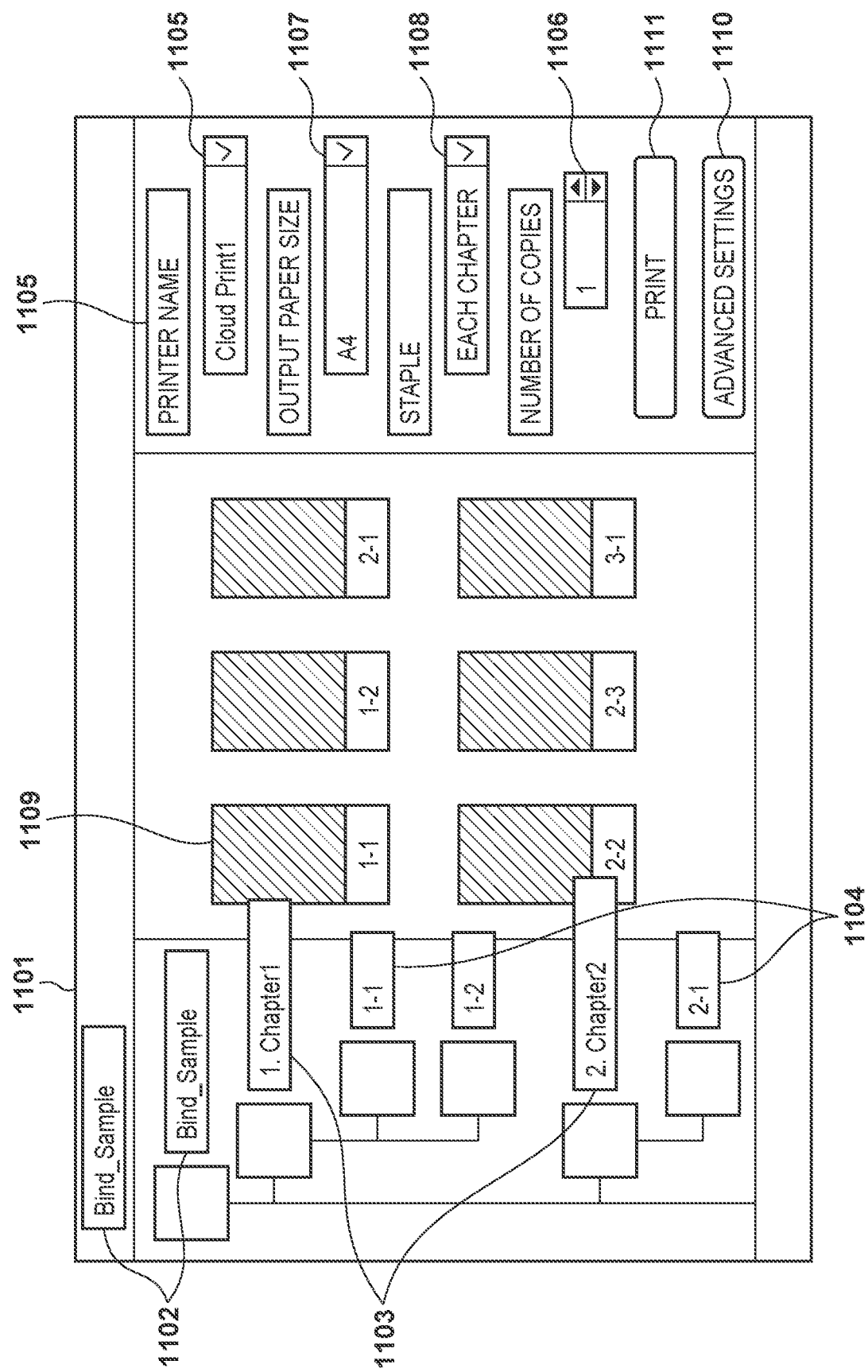

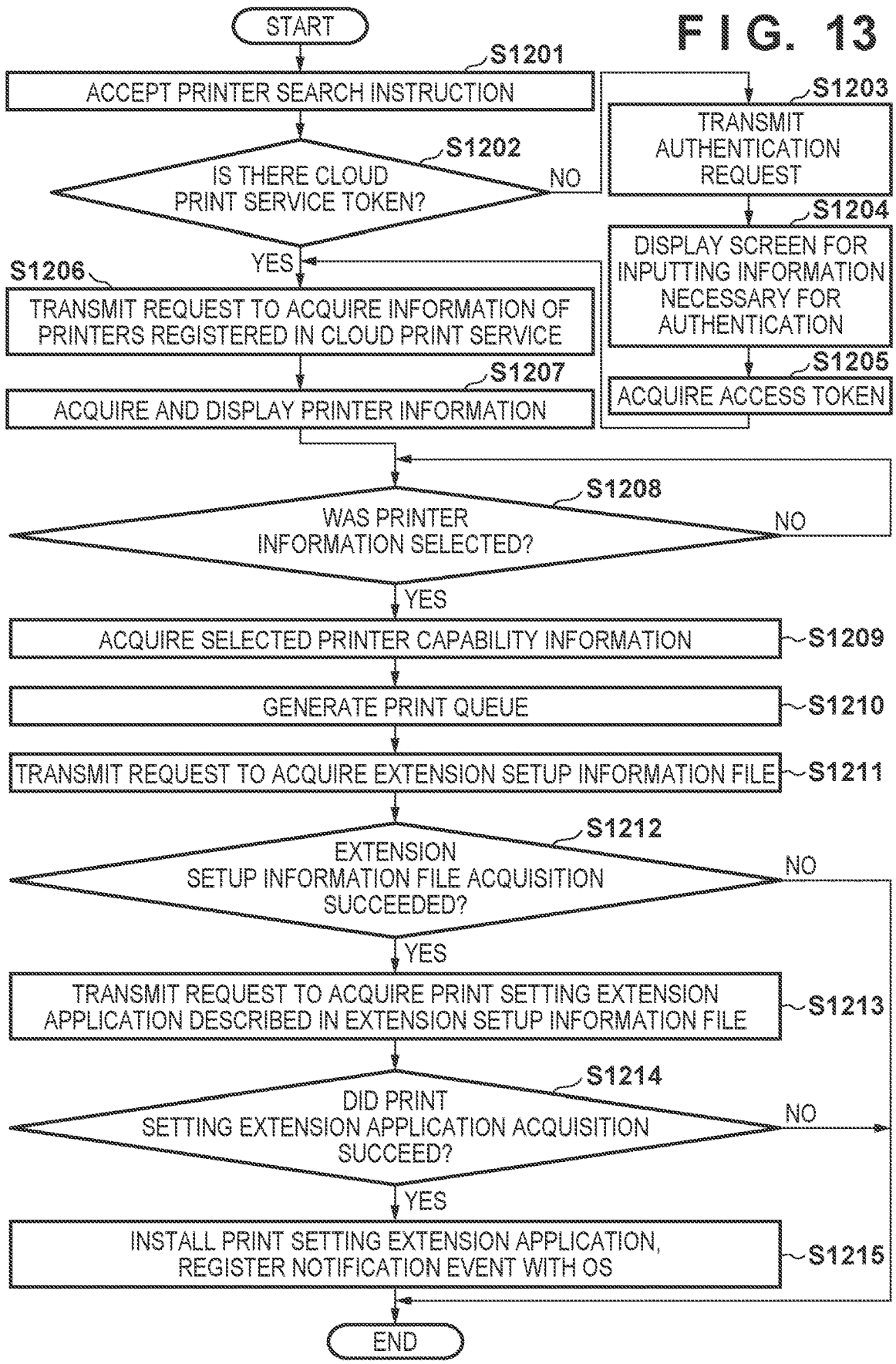

INFORMATION PROCESSING APPARATUS, METHOD, AND NON-TRANSITORY COMPUTER-READABLE STORAGE MEDIUM STORING PROGRAM

BACKGROUND OF THE INVENTION

Field of the Invention

The present invention relates to an information processing apparatus capable to extending the function of a device driver, a method, and a non-transitory computer-readable storage medium storing a program.

Description of the Related Art

In recent years, general-purpose printer drivers using an industry-standard protocol such as the Internet printing protocol (IPP) are known. As the general-purpose printer drivers, there exist a local printer driver directly connected to a printer, and a cloud printer driver that transmits print data to a cloud print service.

The general-purpose printer driver can communicate with printers of a plurality of printer vendors. For this reason, by using the general-purpose printer driver, a user can transmit print data to an image forming apparatus or a cloud print service without installing a printer driver unique to a printer vendor. Since the general-purpose printer driver handles print jobs to be printed by printers of various printer vendors, items and functions that can be set as print settings are limited. Also, in the general-purpose printer driver, printer capability information that can be acquired via the printer driver is similarly limited.

In Japanese Patent Laid-Open No. 2021-124791, when acquiring a driver extension package, the function of a print queue linked with a printer driver is extended using the identification information of a printer linked with the printer driver. There is also known an application that acquires capability information of a printer via a printer driver and performs print settings and printing.

SUMMARY OF THE INVENTION

The present invention provides a mechanism that enables execution of a function according to a capability of a printer by an application.

The present invention in one aspect provides an information processing apparatus comprising an application configured to extend a function of a driver supporting a cloud print service, wherein the application comprises: a first acquisition unit configured to acquire capability information of a printer corresponding to the driver from the cloud print service if printing via the driver is performed; a display unit configured to display a setting screen corresponding to the capability information based on the capability information acquired by the first acquisition unit; a second acquisition unit configured to acquire intermediate data generated by software different from the application based on setting information of the setting screen; and a conversion unit configured to convert the intermediate data acquired by the second acquisition unit into data to be transmitted to the cloud print service.

According to the present invention, it is possible to execute a function according to a capability of a printer by an application.

Further features of the present invention will become apparent from the following description of exemplary embodiments with reference to the attached drawings.

BRIEF DESCRIPTION OF THE DRAWINGS

FIG. 1 is a view showing the configuration of a print system;
FIGS. 3A and 3B are sequence charts showing the sequence between the apparatuses;
FIG. 4 is a view showing a setting screen associated with a printer displayed by an OS;
FIG. 5 is a view showing capability information;
FIGS. 6A and 6B are views showing device capability information;
FIGS. 7A to 7D are views showing device capability information;
FIG. 8 is a view showing an extension setup information file;
FIGS. 9A and 9B are sequence charts showing the sequence between the apparatuses;
FIGS. 10A to 10D are views showing standard print setting screens mounted on the OS;
FIGS. 11A to 11E are views showing print setting screens displayed by a print setting extension application;
FIG. 12 is a view showing an UI screen of a print application;
FIG. 13 is a flowchart showing processing of the OS.

DESCRIPTION OF THE EMBODIMENTS

Figure 2C:
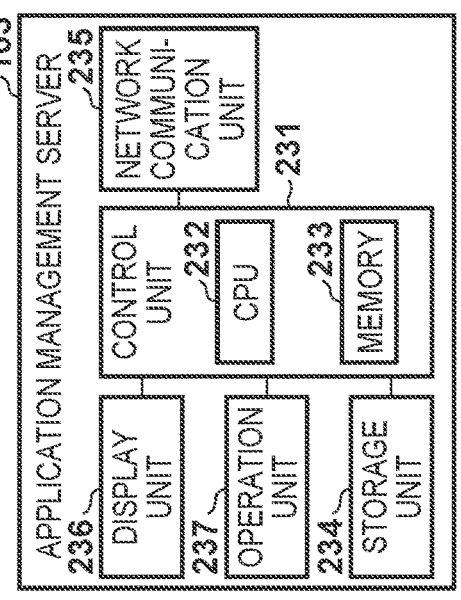
FIGS. 2A to 2E are views showing the hardware configurations of apparatuses.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

For a printer selected by a user for printing, a standard driver mounted on an OS in advance acquires printer capability information of setting items predetermined by the OS. Hence, even if the printer has a capability other than the setting items predetermined by the OS, the user cannot set it using the standard driver. For this reason, in an application that performs print settings and printing via a printer driver, it may be impossible to execute a predetermined function.

According to the present disclosure, it is possible to execute a function according to a capability of a printer by an application.

FIG. 1 is a view showing an example of the configuration of a print system in cloud print according to this embodiment. In the print system, a client terminal 101, a cloud print server 102, an application management server 103, a cloud print supporting printer 104, and an online support server 105 are connected via a network 107. The cloud print server 102 is a server apparatus that provides a cloud print service 321. A cloud printer driver 311 for a cloud print service is installed in the client terminal 101. In this embodiment, the cloud printer driver 311 is, for example, a standard driver mounted on an OS in advance.

In the print system according to this embodiment, a job generated by the cloud printer driver 311 is transferred to the cloud print service 321. Then, printing is performed by the cloud print supporting printer 104 registered in the cloud print service 321.

FIG. 1 shows one client terminal 101 and one cloud print supporting printer 104, but there may be a plurality of client terminals 101 and a plurality of cloud print supporting printers 104. Also, each of the cloud print server 102, the application management server 103, and the online support server 105 may be a server system formed by a plurality of information processing apparatuses. If each server is a server system formed by a plurality of information processing apparatuses, a load can be distributed to the plurality of information processing apparatuses. The cloud print server 102, the application management server 103, and the online support server 105 may virtually be formed in one physical information processing apparatus.

The network 107 is a wired network, a wireless network, or a network including both. In this embodiment, a WAN such as the Internet is assumed as the connection to the cloud print service. However, the network 107 may be a closed environment such as an in-house LAN.

The client terminal 101 is, for example, an information processing apparatus such as a PC, a tablet, or a smartphone, and is a terminal that can directly be operated by a user. On the client terminal 101, arbitrary application software can be executed. Also, on the client terminal 101, an OS 313 that is basic software, and a print setting extension application 312 and a print application 315 can be executed. The cloud print supporting printer 104 is a device that performs printing on a print medium such as a paper sheet, and is an image forming apparatus that converts image data received via the network 107 into print data and prints an image on a print medium.

The cloud print supporting printer 104 can receive, via the cloud print server 102, print data generated by the cloud printer driver 311 of the client terminal 101. Also, the cloud print supporting printer 104 can receive, without interposing the cloud print server 102, print data generated by the cloud printer driver 311 of the client terminal 101 directly from the client terminal 101.

The cloud print server 102 receives print data and a print instruction from the client terminal 101. The cloud print server 102 then transmits the received print data and the print instruction to the cloud print supporting printer 104.

The application management server 103 is a server apparatus that provides an application management service 331 configured to hold and manage various kinds of applications including the print setting extension application 312. The application management server 103 receives identification information of an application and a download request of the application from the client terminal 101. The application management server 103 transmits an application specified based on the received identification information to the client terminal 101.

The online support server 105 is a server apparatus that provides an online support service 351. The online support service 351 provides, to the client terminal 101, an extension setup information file in which pieces of information used to extend the function of the client terminal 101 are described. The extension setup information file is, for example, a file whose extension is inf.

The hardware configuration of each apparatus in the system according to this embodiment will be described next with reference to FIGS. 2A to 2E. FIG. 2A is a block diagram showing an example of the hardware configuration of the client terminal 101. The client terminal 101 includes a display unit 216, an operation unit 217, a storage unit 214, a control unit 211, and a network communication unit 215. The storage unit 214 is, for example, a nonvolatile storage device such as a hard disk or a solid state drive (SSD), and can store and rewrite digital data. The control unit 211 is configured to include a CPU 212 and a memory 213, and comprehensively controls the operation of the entire client terminal 101. The CPU 212 deploys a program stored in the storage unit 214 on the memory 213 and executes it, thereby, for example, implementing the operation of the client terminal 101 according to this embodiment. The memory 213 is the main storage memory of the CPU 212, and is used as a work area or a temporary storage area used to deploy various kinds of programs.

The network communication unit 215 is a device that performs communication with the network 107, and transmits/receives digital data to/from an external server or another client terminal via the network 107. The display unit 216 is a device such as a liquid crystal display configured to display visual information to the user. The operation unit 217 is a device configured to accept an operation input from the user using a keyboard, a mouse, or the like. A device having the functions of both the display unit 216 and the operation unit 217, like a touch panel, may be formed. The configuration of the client terminal 101 is not limited to the configuration shown in FIG. 2A, and can appropriately include a configuration according to a function that the device used as the client terminal 101 can implement.

Figure 2B:
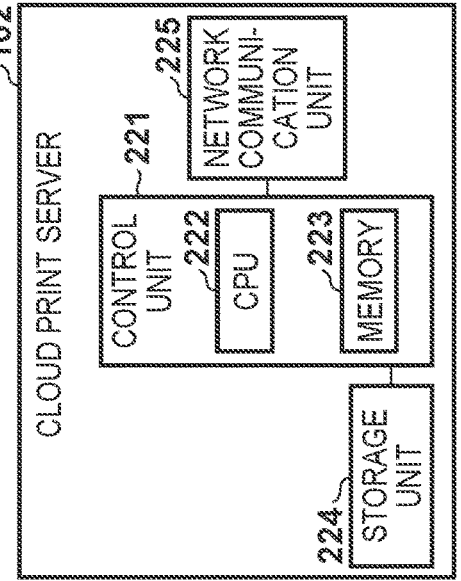

FIG. 2B is a block diagram showing an example of the hardware configuration of the cloud print server 102. The cloud print server 102 includes a storage unit 224, a control unit 221, and a network communication unit 225. The storage unit 224 is, for example, a nonvolatile storage device such as a hard disk or an SSD, and can store and rewrite digital data. The control unit 221 is configured to include a CPU 222 and a memory 223, and comprehensively controls the operation of the entire cloud print server 102. The CPU 222 deploys a program stored in the storage unit 224 on the memory 223 and executes it, thereby, for example, implementing the operation of the cloud print server 102 according to this embodiment. The memory 223 is the main storage memory of the CPU 222, and is used as a work area or a temporary storage area used to deploy various kinds of programs.

The network communication unit 225 is a device that performs communication with the network 107, and transmits/receives digital data to/from an external server or a client terminal via the network 107. The configuration of the cloud print server 102 is not limited to the configuration shown in FIG. 2B, and can appropriately include a configuration according to a function that the device used as the cloud print server 102 can implement. Note that a description will be made assuming that the cloud print server 102 is formed by one information processing apparatus having the hardware configuration shown in FIG. 2B. However, the cloud print server 102 may be formed by a plurality of information processing apparatuses shown in FIG. 2B.

FIG. 2C is a block diagram showing an example of the hardware configuration of the application management server 103. The application management server 103 includes a display unit 236, an operation unit 237, a storage unit 234, a control unit 231, and a network communication unit 235. The storage unit 234 is, for example, a nonvolatile storage device such as a hard disk or an SSD, and can store and rewrite digital data. The control unit 231 is configured to include a CPU 232 and a memory 233, and comprehensively controls the operation of the entire application management server 103. The CPU 232 deploys a program stored in the storage unit 234 on the memory 233 and executes it, thereby, for example, implementing the operation of the application management server 103 according to this embodiment. The memory 233 is the main storage memory of the CPU 232, and is used as a work area or a temporary storage area used to deploy various kinds of programs.

The network communication unit 235 is a device that performs communication with the network 107, and transmits/receives digital data to/from an external server or a client terminal via the network 107. The configuration of the application management server 103 is not limited to the configuration shown in FIG. 2C, and can appropriately include a configuration according to a function that the device used as the application management server 103 can implement. Note that a description will be made assuming that the application management server 103 is formed by one information processing apparatus having the hardware configuration shown in FIG. 2C. However, the application management server 103 may be formed by a plurality of information processing apparatuses.

Figure 2E:
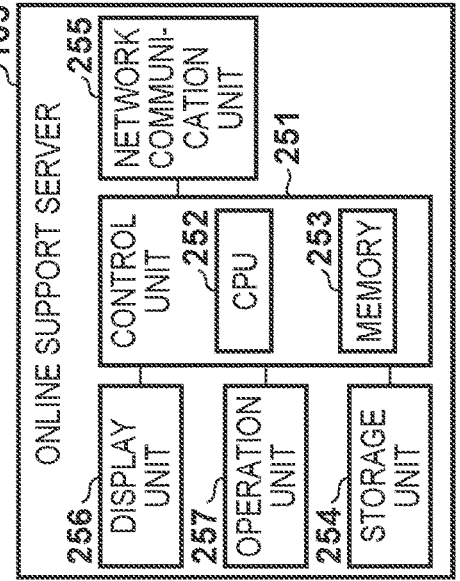
Figure 2A:
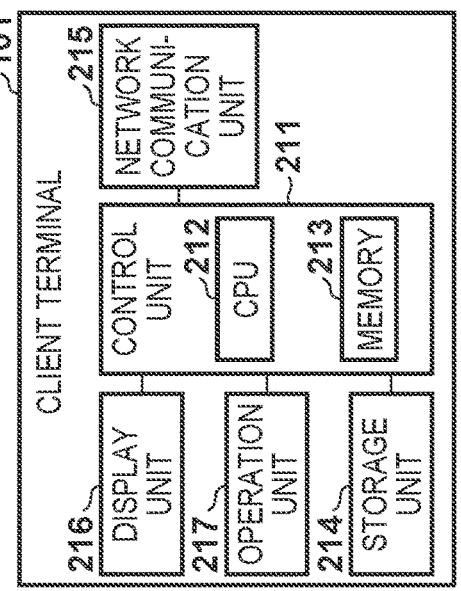
Figure 2D:
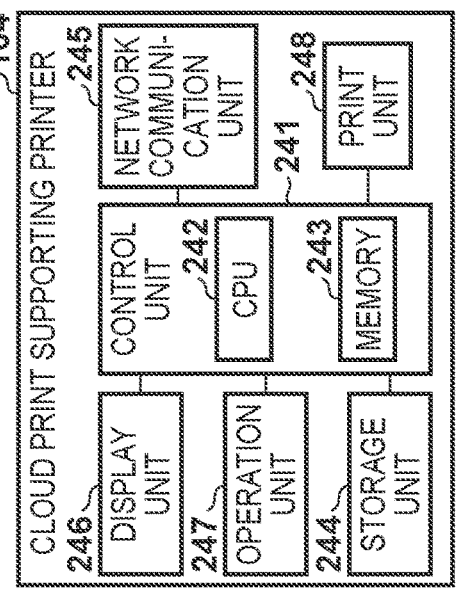

FIG. 2D is a block diagram showing an example of the hardware configuration of the cloud print supporting printer 104. The cloud print supporting printer 104 includes a display unit 246, an operation unit 247, a storage unit 244, a control unit 241, a network communication unit 245, and a print unit 248. The display unit 246 is a device configured to display information to the user, such as a touch panel or an LED equipped on the cloud print supporting printer 104. The operation unit 247 is a device configured to accept an operation input from the user, and may include hard keys such as a ten-key pad in addition to a touch panel. The storage unit 244 is, for example, a nonvolatile storage device such as a hard disk or an SSD, and can store and rewrite digital data. The control unit 241 is configured to include a CPU 242 and a memory 243, and comprehensively controls the operation of the entire cloud print supporting printer 104. The CPU 242 deploys a program stored in the storage unit 244 on the memory 243 and executes it, thereby, for example, implementing the operation of the cloud print supporting printer 104 according to this embodiment. The memory 243 is the main storage memory of the CPU 242, and is used as a work area or a temporary storage area used to deploy various kinds of programs.

The network communication unit 245 is a device that performs communication with the network 107, and mainly receives print data or transmits information representing the state of the cloud print supporting printer 104, such as an error, to an external apparatus such as a server. The print unit 248 is a device that executes print processing by performing a series of operations such as paper feed, printing, and discharge for a print medium such as print paper stored in a cassette or a tray. The printing method of the print unit 248 is not limited and, for example, an electrophotographic method or an inkjet printing method is used. A double-sided unit used at the time of discharge or a finishing device for stapling or punching may be included in the print unit 248. Note that in this embodiment, as an example of the cloud print supporting printer 104, a single function printer that performs only a print function will be described. However, a multi-function printer (MFP) having a scanner function, a FAX function, and the like may be used.

FIG. 2E is a block diagram showing an example of the hardware configuration of the online support server 105. In this embodiment, a description will be made assuming that the online support server 105 is formed by one information processing apparatus. However, the online support server 105 may be formed by a plurality of information processing apparatuses. The online support server 105 includes a display unit 256, an operation unit 257, a storage unit 254, a control unit 251, and a network communication unit 255. The display unit 256 is a device such as a liquid crystal display configured to display visual information to the user. The operation unit 257 is a device configured to accept an operation input from the user using a keyboard, a mouse, or the like. A device having the functions of both the display unit 256 and the operation unit 257, like a touch panel, may be formed. The storage unit 254 is, for example, a nonvolatile storage device such as a hard disk or an SSD, and can store and rewrite digital data. An extension setup information file that is a file which is provided to the client terminal 101 and in which pieces of information used to extend the function are described is stored in the storage unit 254.

The control unit 251 is configured to include a CPU 252 and a memory 253, and comprehensively controls the operation of the entire online support server 105. The CPU 252 deploys a program stored in the storage unit 254 on the memory 253 and executes it, thereby, for example, implementing the operation of the online support server 105 according to this embodiment. The memory 253 is the main storage memory of the CPU 252, and is used as a work area or a temporary storage area used to deploy various kinds of programs.

The network communication unit 255 is a device that performs communication with the network 107, and transmits/receives digital data to/from an external server or a client terminal via the network 107. For example, the online support server 105 receives, from the client terminal 101 via the network communication unit 255, an acquisition request for the extension setup information file stored in the storage unit 254. The online support server 105 then transmits a corresponding extension setup information file to the client terminal 101.

An example of the sequence between the apparatuses or between the services according to this embodiment will be described next with reference to FIGS. 3A and 3B. FIGS. 3A and 3B shows the sequence after the cloud print supporting printer 104 is registered in the cloud print service 321 until the print setting extension application 312 is installed in the client terminal 101. The sequence between the apparatuses will be described below as the sequence between the services.

First, the cloud print supporting printer 104 accepts, from the user, a printer registration operation for registering the cloud print supporting printer 104 in the cloud print service 321. The cloud print supporting printer 104 transmits a printer registration request to the cloud print service 321 together with the device identification information of the printer (S301). Here, the device identification information transmitted to the cloud print service 321 is, for example, a hardware ID (HWID) assigned to each printer model. Note that the device identification information can be any information if it can identify the model of the printer.

Upon receiving the printer registration request, the cloud print service 321 transmits the URL of the cloud print service 321 for printer registration to the cloud print supporting printer 104. If the user accesses from the cloud print supporting printer 104 or the information processing apparatus to the URL, an input screen used to input a user ID and a password is displayed on the display unit of the terminal that has accessed the URL. The user inputs the user ID and the password for using the cloud print service 321, thereby logging in to the cloud print service 321. If the login of the user succeeds, the cloud print service 321 transmits an acquisition request for information necessary for printer registration to the cloud print supporting printer 104. In response to the request, the cloud print supporting printer 104 transmits printer information to the cloud print service 321. The cloud print service 321 registers the printer information (device identification information and the like) of the cloud print supporting printer 104 and generates a print queue for the cloud print supporting printer 104. At this time, the cloud print service 321 acquires the capability information of the cloud print supporting printer 104 and links it with the generated print queue. Capability information is information representing functions mounted on the printer, and indicates information necessary for the user to set as print settings at the time of printing, for example, whether double-sided printing is possible, whether color printing is possible, and whether stapling is possible.

FIG. 5 is a view showing an example of capability information of a printer. The capability information of a printer is configured to include item names and attribute values. The column on the left side of FIG. 5 shows item names, and the column on the right side shows attribute values. Item names correspond to the setting items of print settings. Attribute values correspond to set values, options, and ranges that can be set in the setting items. The cloud print supporting printer 104 stores item names and attribute values uniquely defined by printer vendors in addition to item names and attribute values defined as the industry-standard specifications by the Internet printing protocol (IPP). As the item names defined as the industry-standard specifications by the IPP, for example, item name "staple" and an attribute value (for example, "none" or "upper left") representing where to staple are registered as the capability information of staple. Also, "multiple document handling" that is an item representing whether a plurality of documents in a job can be handled is registered together with attribute values "only one" and "on document basis". If "only one" is registered, even if a plurality of documents exist in a job, an operation is performed to handle the whole job as one document. For example, concerning staple, an operation of binding a plurality of documents together is performed. On the other hand, if "on document basis" is registered, an operation of stapling each of a plurality of documents is performed.

On the other hand, of the item names shown in FIG. 5, for example, "maximum number of document divisions" and associated attribute values are item names uniquely defined by printer vendors. "Maximum number of document divisions" defines the maximum number of documents in a case where document is to be, for example, stapled in "multiple document handling". In addition to "maximum number of document divisions", "save job in printer", "abbreviate job name", "stapleless binding", and attribute values associated with these are item names and attribute values uniquely defined by printer vendors. "Save job in printer" is a setting item for setting whether print data that the printer receives from the cloud print service 321 should be saved in the printer even after printing. "Abbreviate job name" is an item for setting whether to abbreviate a name added to print data and display when the printer displays the bibliography information of print data that the printer receives from the cloud print service 321 on the display unit 246 of the printer. "Stapleless binding" is an item for setting whether to bind output sheets based on print data that the printer receives from the cloud print service 321 without using staples. Binding without using staples means that sheets are bound by, for example, pressure bonding. Note that as attribute values corresponding to item names defined as the industry-standard specifications, attribute values unique to the printer vendors may be defined. For example, "folding setting" is an item name defined by the IPP. On the other hand, "saddle folding" that is one of the attribute values of "folding setting" is a function of folding and discharging one or more sheets together without stapling these, and this is an attribute value uniquely defined by a printer vendor.

In this embodiment, the cloud print supporting printer 104 transmits capability information to the cloud print service 321 in accordance with the IPP that is a communication protocol. The cloud print supporting printer 104 registers the capability information using a command prepared for the cloud print supporting printer 104 to register capability information in the cloud print service 321. The cloud print supporting printer 104 notifies the cloud print service 321 of the item names shown in FIG. 5 and attribute values and default values corresponding to the item names. Here, the capability information that the cloud print supporting printer 104 notifies is not associated with whether the items and the attribute values are defined by the IPP. For example, even concerning "maximum number of document divisions", "save job in printer", "abbreviate job name", and "stapleless binding" shown in FIG. 5, the item names and the attribute values are notified to the cloud print service 321. Also, "saddle folding" that is one of the attribute values of "folding setting" and is an attribute value unique to the printer vendor is also notified to the cloud print service 321 as one of the attribute values of "folding setting".

Installation of the print setting extension application 312 in the client terminal 101 will be described next. Installation of the print setting extension application 312 is executed when the user performs, on the client terminal 101, a setup operation for printing by the cloud print supporting printer 104. To register the cloud print supporting printer 104 in the client terminal 101, a standard print function that is one of the functions of the operating system (OS) 313 of the client terminal 101 is used. The OS 313 accepts a printer adding operation that is one of the setup operations by the user (S302). The setup operation for printing by the cloud print supporting printer 104 is an operation accepted via, for example, a screen shown in FIG. 4.

FIG. 4 shows a setting screen concerning a printer, which is displayed by the OS 313 of the client terminal 101. If the user selects an object 401, a printer search instruction is accepted by the OS 313. The OS 313 that has accepted the printer search instruction determines whether an access token to the cloud print service 321 is held. Upon determining that no access token is held, the OS 313 displays a screen (not shown) configured to input user information (a login name and a password). The OS 313 transmits the user information input via the screen to the cloud print service 321, and requests user authentication and an access token (S303).

The cloud print service 321 performs authentication processing using the user information received from the client terminal 101 (S304). If the authentication processing is completed, the cloud print service 321 notifies the client terminal 101 of the result of the authentication processing. Here, if the user authentication succeeds, the OS 313 acquires an access token from the cloud print service 321 (S305). On the other hand, if the user authentication fails, the cloud print service 321 notifies the client terminal 101 of an authentication error (S306). The OS 313 stops the processing based on the information of the received authentication error, and ends the processing shown in FIGS. 3A and 3B (S307). If the OS 313 holds an access token, or an access token is acquired in S305, the process advances to S308.

The OS 313 searches for printers registered in the cloud print service 321 and printers connected to the network 107. The search of printers connected to the network 107 is search of devices by mDNS or Bonjour. The OS 313 transmits, to the cloud print service 321, an acquisition request for printer information registered in the cloud print service 321, thereby searching for printers (S308).

The cloud print service 321 that has received the printer information acquisition request transmits printer information to the client terminal 101 (S309). The printer information transmitted to the client terminal 101 in S309 is information including printer names added to printers registered in the cloud print service 321 and device identification information (HWID) of the printers.

Upon acquiring the printer information transmitted from the cloud print service 321, the OS 313 displays a printer list on the display unit 216 based on the printer information and printer information detected by searching the network 107.

In a region 402 shown in FIG. 4, the pieces of printer information received from the cloud print service 321 are displayed in a list. Of the printer information displayed in the region 402, "Cloud Printer 001/002/003" are information of printers registered in the cloud print service 321. On the other hand, "Printer XX" is a printer detected by the client terminal 101 searching the network 107. Thus, the information of the printers acquired from the cloud print service 321 and the information of the printers detected by searching the network 107 are displayed in a list. Each printer information received from the cloud print service 321 is displayed with an icon 403 added thereto. On the other hand, each printer information detected by searching the network 107 is displayed with an icon 404 added thereto. This makes it possible to discriminately display the printer information received from the cloud print service 321 and the printer information detected by searching the network 107. Note that only the information of the printers registered in the cloud print service 321 may be displayed.

Next, the user selects printer information corresponding to a printer to be registered in the client terminal 101 from the printer information displayed in the region 402. The OS 313 inquires of the cloud print service 321 about the capability information of the printer corresponding to the selected printer information (S310). For which setting item the capability information should be inquired by the OS 313 is determined by the specifications of the OS 313, and is set in the OS 313 in advance. The OS 313 designates setting items stored in advance and makes inquiry about capability information. The setting items stored in the OS 313 in advance are setting items defined as standard specifications by the IPP, and includes, for example, items "paper size", "paper type", and "color mode".

The cloud print service 321 returns the capability information of the cloud print supporting printer 104 to the OS 313 (S311). Note that in this embodiment, a description will be made assuming that the information registered in the cloud print service 321 in S301 is transmitted to the client terminal 101 in S311. However, capability information registered in the cloud print service 321 at a timing other than described above may be transmitted to the client terminal 101. For example, capability information registered in the cloud print service 321 in association with a change of the capability information of the cloud print supporting printer 104 may be transmitted to the client terminal 101. Alternatively, the user may instruct updating of the capability information on a user interface provided by the cloud print service 321, and the capability information updated in accordance with the instruction may be transmitted to the client terminal 101. Otherwise, the cloud print service 321 may acquire capability information from the cloud print supporting printer 104 at the timing of S310 and notify the client terminal 101 of the acquired capability information.

In S311, concerning the setting items designated from the client terminal 101, the cloud print service 321 transmits attribute values and default values corresponding to the setting items. The attribute values transmitted here are all attribute values registered in the cloud print service 321 regardless of whether these attribute values are defined as standard. A default value is a value set first when the client terminal 101 displays a print setting screen. Note that if a response to the capability information inquired by the OS 313 of the client terminal 101 is not stored, the cloud print service 321 does not respond to the OS 313.

Next, based on the device identification information and the printer name of the printer selected by the user, the OS 313 starts installing the cloud printer driver 311. Then, the OS 313 generates a print queue of the cloud printer driver 311 that has basic device capability information and is packaged together in the OS 313 (S312). Device capability information indicates definition information necessary for generating print setting information of a printer driver, for example, information described in XML such as PrintDeviceCapabilites. FIGS. 6A and 6B are views showing an example of device capability information in an initial state, which is packaged together in the OS 313. For example, "Feature" shows that "PageMediaSize" indicating a paper size is a setting item. "Option" indicates an option corresponding to "PageMediaSize". As the initial values of the device capability information, there are only two options "A4" and "LETTER" as paper sizes, as shown in FIGS. 6A and 6B. This information is stored in linkage with the print queue at the time of generation of the print queue, and managed by the OS 313. Note that the device capability information in the initial state is fixed device capability information regardless of the information of the connected printer.

After that, using the capability information acquired from the cloud print service 321, the OS 313 updates the device capability information forming the cloud printer driver 311. FIGS. 7A to 7D are views showing an example of device capability information updated using the capability information acquired from the cloud print service 321. For example, concerning the staple function, not only "Job Staple" for performing stapling for a whole job but also "DocumentStaple" for performing stapling on a document basis is added. Also, for "PageMediaSize" indicating the paper size, "Option" other than "A4" and "LETTER" is added as a paper size printable by the cloud print supporting printer 104. Thus, the client terminal 101 first registers the cloud printer driver 311 and the device capability information packaged together in the OS 313 in the print queue in association with each other. The device capability information linked with the print queue is updated by the capability information acquired from the cloud print service 321. At this time, the OS 313 updates the device capability information using only the attribute values defined by the industry-standard specifications in the capability information acquired from the cloud print service 321. For this reason, for example, when acquiring capability information, even if an attribute value unique to a printer vendor is acquired as a paper type, the attribute value unique to the printer vendor is not added to the device capability information.

As described above, it is possible to set a print set value that is not set by the device capability information packaged together in the OS 313.

The installation of the cloud printer driver 311 is thus completed. By performing the processing up to this point, print data can be transmitted from the client terminal 101 to the print queue for the cloud print supporting printer 104 generated in the cloud print service 321.

Installation processing of the print setting extension application 312 that extends the function of the cloud printer driver 311 based on the selected printer information will be described next. Since the cloud printer driver 311 handles jobs to be printed by printers of various printer vendors, settable items and functions are limited. When the print setting extension application 312 is installed, the user can use a function unique to a printer vendor.

First, the OS 313 performs processing of adding identification additional information to the device identification information (HWID). This processing is processing necessary for acquiring an extension setup information file from the online support server 105, and identification additional information is added such that a character string different from the device identification information is generated. In this embodiment, the OS 313 adds, to the device identification information, identification additional information indicating that it is an application corresponding to a printer. For example, "PrinterApp_" is added as identification additional information to the device identification information. Note that "PrinterApp_" is merely an example, and another character string, a number, or a symbol may be used. As the result of the above-described processing, for example, if the device identification information of the cloud print supporting printer 104 is "device001", the device identification information after the identification additional information adding processing is "PrinterApp_device001".

The OS 313 transmits, to the online support service 351, a search request for an extension setup information file including the device identification information with the additional information as a target (S313). By S313, the online support service 351 is notified of "PrinterApp_device001" added with the identification additional information.

In the online support service 351, an extension setup information file shown in FIG. 8 is stored. FIG. 8 shows an example of an extension setup information file. The extension setup information file is a file created by the printer vendor of the cloud print supporting printer 104 and registered in the online support service 351.

In the extension setup information file, an application identifier used to identify a print setting extension application used for setting of print data to be sent to the cloud print supporting printer 104 is described. In the extension setup information file shown in FIG. 8, an item "PackageFamilyName" is the identification information of the print setting extension application. On the other hand, in "PrinterHardwareID", a character string generated by adding identification additional information to the identification information of the cloud print supporting printer 104 is described.

Note that in the online support service 351, an extension setup information file in which the identification information of the printer driver is stored in addition to the extension setup information file in which the identification information of the print setting extension application is described. In the extension setup information file in which the identifier of the printer driver is described, the identifier of the printer driver is described in "PackageFamilyName". Device identification information without identification additional information is described in "PrinterHardwareId".

As described above, in the online support service 351, both the extension setup information file in which the identifier of the printer driver is described and the extension setup information file in which the identifier of the print setting extension application is described are stored. For this reason, the OS 313 adds identification additional information to the device identification information to appropriately acquire a necessary extension setup information file.

The online support service 351 that has received the search request specifies an extension setup information file whose "PackageFamilyName" in the file matches the device identification information with the identification additional information designated by the request.

As the result of the search, if the online support service 351 stores the extension setup information file including the device identification information as the target, the online support service 351 transmits the extension setup information file to the OS 313 (S314). At this time, the contents of the extension setup information file are written in a registry of the OS 313.

Next, the OS 313 installs extension setup information described in the extension setup information file acquired from the online support service 351 in linkage with the print queue generated in S312 (S315).

Next, the OS 313 extracts an application ID from the installed extension setup information (S316). The application ID is an identifier defined by "PackageFamilyName" in the extension setup information file. This is processing performed when the extension setup information file corresponding to the cloud print supporting printer 104 is stored in the online support service 351.

As the result of the search, the online support service 351 may not store the extension setup information file including the device identification information as the target. At this time, the OS 313 completes the installation of the cloud printer driver 311, and stops the application installation processing (S317). If the extension setup information file cannot be received within a predetermined time from the search request of the OS 313, or if an error notification is received from the online support service 351, the OS 313 executes the processing of S317.

From S318, processing performed when the extension setup information file can be acquired, and the application ID can be extracted in S316 will be described.

The OS 313 requests the application management service 331 to search for an application whose ID matches the extracted application ID (S318). The application management service 331 stores an application that operates on the client terminal 101 and an application ID that is the identifier of the application in association with each other. The application and the application ID are registered in the application management service 331 by the printer vendor that provides the cloud print supporting printer 104.

If the application management service 331 holds the print setting extension application 312 whose ID matches the requested application ID, the application management service 331 transmits the print setting extension application 312 to the client terminal 101 (S319). The print setting extension application 312 transmitted here is the application to which the same ID as the requested application ID is added.

The OS 313 installs the acquired print setting extension application 312 in association with the print queue on the side of the client terminal 101 (S320). The OS 313 stores, in a registry, the application ID as the information of the print queue. Also, the print setting extension application 312 does settings in the OS 313 such that the print queue linked with the application makes an event notification to the OS 313 at a predetermined timing. The installed print setting extension application 312 is activated after the client terminal 101 is powered on, and the OS 313 is activated, and operates as a background task after the activation.

If the application management service 331 does not hold the print setting extension application 312 whose ID matches the requested application ID, the OS 313 stops the installation processing of the application (S321). In this case, the generated print queue and the cloud printer driver 311 are installed in linkage, and the processing is ended without linking the print setting extension application 312 with the print queue.

Note that in the above description, a predetermined character string is added to the device identification information of the cloud print supporting printer 104, and the extension setup information file is searched for. However, if the file for installation of the printer driver can be identified, the search may be performed without adding a predetermined character string.

Figure 9A:
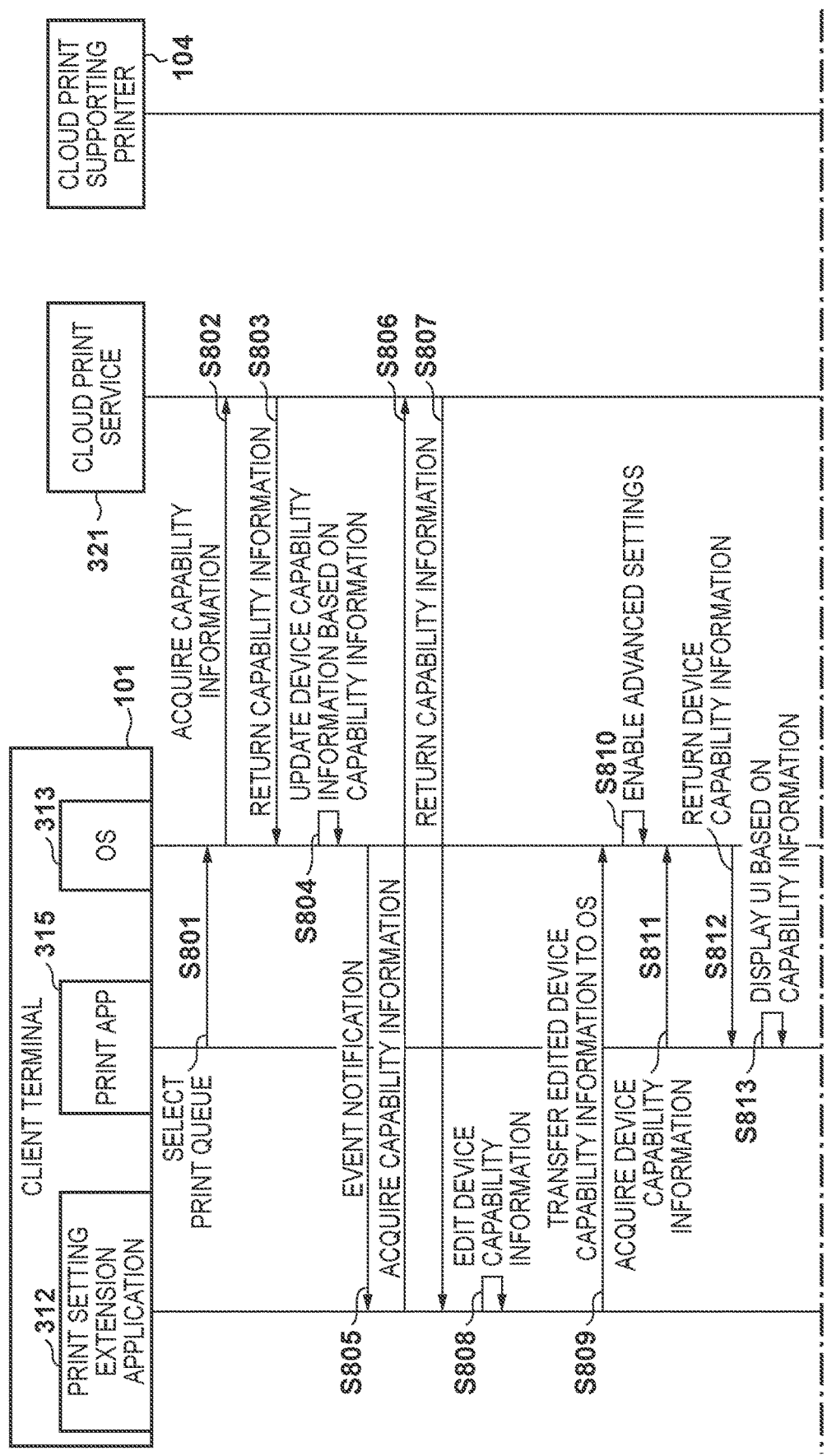

An example of the sequence between the apparatuses or between the services according to this embodiment will be described next with reference to FIGS. 9A and 9B. FIGS. 9A and 9B show the sequence after the print queue created in S312 of FIGS. 3A and 3B is selected until print data is transmitted to the cloud print service 321. The sequence between the apparatuses will be described below as the sequence between the services. The print application 315 in FIGS. 9A and 9B is an application that displays a UI for print setting from the capability information of the printer, generates print data in accordance with selection of the user, and performs printing. The print application 315 is, for example, an application such as a document data creation application, a presentation data creation application, or a display application for photos and image data.

FIG. 12 is a view showing an example of an UI screen of the print application 315. A UI screen 1101 shown in FIG. 12 is displayed when an instruction to open or newly create a document file is received, and the print application 315 is executed. An object 1102 indicates the name of the document file. An object 1103 indicates the contents in the document file. An object 1104 indicates a page. An object 1109 indicates thumbnail display of the text data of the document file. An object 1105 indicates a print queue selection control. The print queue selection control displays, as options, a list of printer drivers installed in the storage unit 214 and decides a printer to print in accordance with a user designation. An object 1111 indicates a print button. The print button requests, via the OS, a printer driver associated with the print queue of the printer selected by the object 1105 in accordance with a user instruction to perform print processing.

An object 1107 indicates an output paper size selection control. The device capability information shown in FIGS. 7A to 7D is acquired from the printer driver of the printer selected by the object 1105, a list is created by referring to "psk:PageMediaSize", and an output paper size is decided in accordance with a user designation. An object 1108 is a staple control for setting a staple function. For the options of staple control as well, the device capability information shown in FIGS. 7A to 7D is acquired from the printer driver, and if "psk:JobStapleAllDocuments" exists, "whole job" is displayed as an option. If "psk:DocumentStaple" exists, "on chapter basis" is displayed as an option. A point to staple may be displayed as an option based on "psk:StapleTopLeft" (upper left) that is an option of "psk:JobStapleAllDocuments" or "psk:DocumentStaple". An object 1106 is a copy number control for setting a copy number.

FIG. 12 shows only controls corresponding to the output paper size and the staple function. However, the controls to be displayed are not limited to these. If the print setting extension application 312 is linked with the print queue, a control corresponding to a function described in the device capability information shown in FIGS. 7A to 7D can be displayed.

The object 1109 indicates thumbnail display of the document file. The thumbnail display is displayed while reflecting the output paper size selected by the object 1107. An object 1110 is a button configured to display FIG. 11 that is the print setting screen of the printer driver selected by the object 1105.

The procedure of setting at the time of printing and printing will be described below with reference to FIGS. 9A and 9B.

The print application 315 selects a print queue (S801). In this embodiment, assume that the cloud print supporting printer 104 is selected. Note that processing from S801 is executed even if the user changes the printer to be used by the object 1105.

Next, the OS 313 inquires of the queue on the cloud print service 321 corresponding to the cloud print supporting printer 104 about the capability information of the cloud print supporting printer 104 (S802). For which setting item the capability information should be inquired is determined by in advance the specifications of the OS 313. For this reason, the capability information acquired at this timing is the same as that acquired in S301 of FIGS. 3A and 3B. The inquiry is made for the cloud print service 321 using, for example, a command of a standard protocol defined by the IPP, like Get-print-Attributes. If Get-print-Attributes is used, capability information determined by the OS 313 is inquired in a list format.

Based on the list of capability information sent by Get-print-Attributes, the cloud print service 321 transmits the capability information of the cloud print supporting printer 104 to the OS 313 (S803). For example, assume that the attribute of a medium size is designated by Get-print-Attributes (IPP). If the attribute of the medium size is held, the cloud print service 321 transmits a value (A4, B5, Letter, or the like) linked with the attribute. If the attribute designated by Get-print-Attributes does not exist in the queue on the cloud print service 321 corresponding to the cloud print supporting printer 104, the cloud print service 321 does not respond to the OS 313.

Using the capability information acquired from the cloud print service 321, the OS 313 updates device capability information. The OS 313 adds the capability information acquired in S803 of FIG. 8 to the device capability information generated in S312 of FIGS. 3A and 3B (S804). By the process of S803, the device capability information managed by the client terminal 101 is updated. Note that when updating the device capability information in S804, the device capability information is updated only concerning the attribute values defined by the industry-standard specifications.

Next, the OS 313 notifies the print setting extension application 312 of an event and an API to be used for editing of the device capability information (S805). Note that the event notification timing is the timing registered when the print setting extension application 312 is installed in the OS 313 of the client terminal 101.

Upon receiving the event, the print setting extension application 312 requests the cloud print service 321 to acquire capability information. The acquisition of capability information here is performed to write setting items and attribute values uniquely defined by the printer vendor in the device capability information.

Upon receiving the event from the OS 313, the print setting extension application 312 inquires, via the cloud print service 321, about the capability information of the cloud print supporting printer 104 (S806). At this time, the print setting extension application 312 inquires of the cloud print service 321 about setting items unique to the printer vendor or capability information of setting items including attribute values unique to the printer vendor. The inquiry is performed using Get-print-Attributes, like S802, and capability information is acquired by designating, as item names, the item names of setting items that should be inquired. Note that in this embodiment, a description will be made assuming that in S806, capability information is acquired concerning setting items uniquely defined by the printer vendor or setting items including attribute values uniquely defined by the printer vendor. Note that even a setting item already acquired when capability information is acquired by the OS 313 may be acquired again.

If the inquiry of the capability information unique to the printer vendor is received from the print setting extension application 312, the cloud print supporting printer 104 responds to the print setting extension application 312 via the cloud print service 321 (S807). The responding method here is the same as in S311 of FIGS. 3A and 3B. In this embodiment, in S807, the cloud print service 321 returns the capability information of the cloud print supporting printer 104 stored in the cloud print service 321. Note that upon receiving the request in S806, the cloud print service 321 may reacquire the capability information from the cloud print supporting printer 104 and return it to the client terminal 101.

Upon acquiring the capability information from the cloud print supporting printer 104, the print setting extension application 312 edits the device capability information managed by the OS 313 via a configuration information object. The configuration information object is a set of data groups necessary for editing device capability information. The print setting extension application 312 cannot directly edit the device capability information held by the OS 313. For this reason, the print setting extension application 312 changes the device capability information held by the OS 313 using the configuration information object. Pieces of capability information such as "maximum number of document divisions", "stapleless binding", and "save job in printer" acquired in S807 of FIG. 8 are converted into device capability information and added to the configuration information object, thereby editing the device capability information (S808). By performing the processing up to S808, setting items and attribute values unique to the printer vendor are stored in the device capability information in addition to the capability information concerning standard setting items acquired in response to the inquiry by the OS 313.

Next, the print setting extension application 312 transfers the edited device capability information to the OS 313 (S809). The OS 313 stores the device capability information acquired from the print setting extension application 312 in linkage with the print queue.

After the device capability information is updated, the OS 313 enables an object serving as a trigger for displaying the print setting screen of the print setting extension application 312 (S810). The object serving as the trigger for displaying the print setting screen of the print setting extension application 312 is, for example, the button 1110 shown in FIG. 12. Until the processing of S810 is completed, the button 1110 is grayed out (disabled), and even if the user clicks it, the print setting screen of the print setting extension application 312 is not displayed. If the processing of S810 is completed, gray-out of the button 1110 is canceled, and the user can select the button 1110. The print application 315 requests the OS 313 to acquire the device capability information (S811). The OS 313 returns the device capability information of the cloud print supporting printer 104 to the print application 315 (S812). As described with reference to FIG. 12, the print application 315 refers to the device capability information acquired in S812, and constructs and displays UIs for print setting, such as displays 1107 and 1108. If the user selects the button 1110, the print setting extension application 312 is activated, and a print setting screen as shown in FIGS. 11A to 11E is displayed (S814). The print setting screen shown in FIGS. 11A to 11E does not depend on the type of the print application 315.

Note that if the print setting extension application 312 is not linked with the selected print queue, a standard print setting screen mounted on the OS 313 in advance, as shown in FIG. 10A, is displayed. In the standard print setting screen, if pressing of an advanced setting button 901 is accepted, an advanced print setting screen shown in FIG. 10B is displayed, and an advanced print setting screen configured to set setting items that cannot be displayed in FIG. 10A is displayed. Note that the advanced print setting screen shown in FIG. 10B can be scrolled by operating a scroll bar, and the user can do print settings for a plurality of setting items supported by the OS 313, as shown in FIGS. 10C and 10D. Note that the user can store the set print settings and return to FIG. 10A by selecting an OK button 902. An apply button 903 shown in FIG. 10A is a button for storing print settings, and a cancel button 904 is a button for returning to the screen shown in FIG. 12 without storing the print settings. If the user selects an OK button 905, the print settings are stored, and the screen returns to the screen shown in FIG. 12. Note that in FIGS. 10A to 10D, print setting items and attribute values uniquely defined by the printer vendor cannot be set.

The print setting extension application 312 receives print setting information generated based print setting capability information that the OS 313 generates from the device capability information, and displays an extended print setting screen shown in FIG. 11A. The extended print setting screen can be scrolled by the user operating a scroll bar, as shown in FIGS. 11A to 11E, and the user can set the set values of various print setting items.

For example, the output paper size of a setting item 1001 in FIG. 11A is print setting information generated from "psk:PageMediaSize" in FIGS. 7A to 7D. Also, "A4" that is an option of the output paper size is displayed by the print setting extension application 312 based on information "psk:IOSA4" in the print setting information. In this way, the print setting extension application 312 converts device capability information into set values and displays the extended print setting screen. Since the extended print setting screen is generated from the device capability information including capability information concerning setting items unique to the printer vendor, it is possible to set setting items and set values that cannot be set in the screens shown in FIGS. 10A to 10D provided by the OS 313.

The user selects an object 1002 in the screen shown in FIGS. 11A to 11E displayed by the print setting extension application 312. The object 1002 is an object configured to determine print settings. The print setting extension application 312 provides a function for arbitrarily changing print settings by the user, and if a print setting is changed, stores the set value. For example, assume that the user changes the output paper size from A4 to Letter on the UI. In this case, the print setting information held by the print setting extension application 312 is changed from A4 to Letter. If the object 1002 is selected, the print setting extension application 312 acquires, from the print setting screen, the print setting information processed in the control of the print setting screen and transfers the print setting information to the OS 313. After the print setting information is transferred to the OS 313, the print setting extension application 312 ends the display of the print setting screen shown in FIG. 11A (S815). When the processing of S815 is completed, the print application 315 receives the updated print setting information, and reflects it on the objects 1106, 1107, and 1108 that are controls for print setting of the print application 315 (S816). For example, if the output paper size is changed from A4 to Letter, as described above, the object 1107 is also changed from A4 to Letter.

If the user selects the object 1111 in the screen shown in FIG. 12, the print application 315 generates intermediate data (S817). Next, the print application 315 outputs a print instruction to the OS 313, and the OS 313 executes processing associated with printing based on the instruction input via the print application 315 (S818).

If execution of printing is instructed, the OS 313 transfers the intermediate data to the print setting extension application 312 (S819). Intermediate data is data generated before conversion to print data such as PDL, and is, for example, XPS data. Print setting information (PrintTicket) is also included in the intermediate data.

Figure 17:
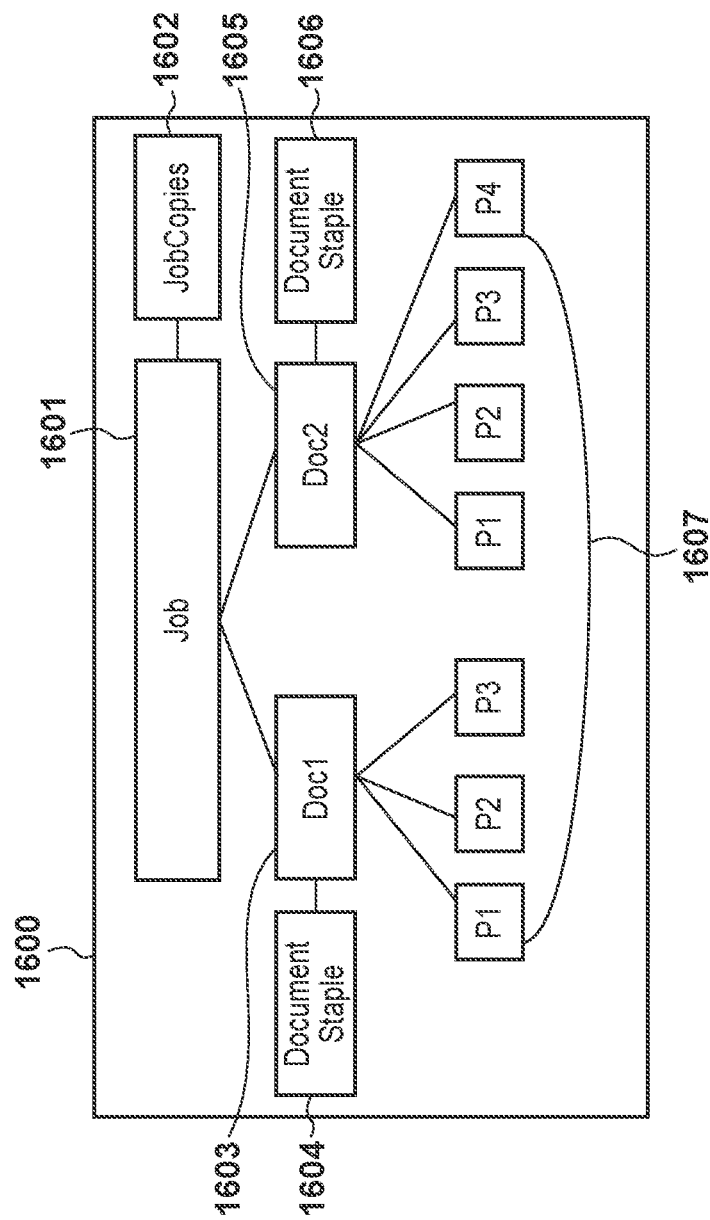
FIG. 17 is a view showing the configuration of intermediate data.

FIG. 17 is a view showing an example of the configuration of intermediate data. A job 1601 represents the layer of a job in intermediate data 1600. A print setting 1602 is a print setting associated with the layer of the job, and the number of copies is set in FIG. 17. Documents 1603 and 1605 represent the layer of documents that form the job 1601. Print settings 1604 and 1606 represent print settings associated with the documents. In FIG. 17, a print setting for performing stapling on a document basis is associated. Pages 1607 represent pages that form the documents 1603 and 1605. In this embodiment, the intermediate data is generated by the print application 315. If the print application 315 generates intermediate data, the object 1102 representing the layer of the document file corresponds to the layer of the job, and the object 1103 representing the layer of the chapters corresponds to the layer of the documents. Also, when outputting a print instruction to the OS 313, the print application 315 may transfer data in a format different from the intermediate data. In this case, the OS 313 generates intermediate data. Other formats are, for example, GDI (drawing data) and print settings (DEVMODE).

Upon receiving the intermediate data from the OS 313, the print setting extension application 312 generates print data based on the intermediate data, and generates print capability information based on the print setting information included in the intermediate data (S820). Print data is, for example, PDL data, like a PDL file, and the print capability information is, more specifically, information that describes print setting information by attribute values defined by the IPP. The print setting extension application 312 transfers the generated print data and print capability information to the print queue of the OS 313 (S821).

Processing of S819 to S821 is processing in a case where the print setting extension application 312 linked with the print queue is installed in the client terminal 101. If the print setting extension application 312 is not installed in the client terminal 101, the client terminal 101 executes processing of S822. That is, the OS 313 generates intermediate data, edits the page layout, converts the intermediate data into a predetermined format, and generates print data and print capability information (S822). Here, the predetermined format is, for example, PDF, PWG-Raster, or the like.

The OS 313 transmits the print data and the print capability information transferred from the print setting extension application 312 or the print data and the print capability information generated by the OS 313 to the cloud print service 321 via the print queue (S823). The cloud print service 321 transmits the print data and the print capability information transferred from the client terminal 101 to the cloud print supporting printer 104 (S824). Note that in this embodiment, upon receiving the print data and the print capability information, the cloud print service 321 transmits the received print data and print capability information to the cloud print supporting printer 104. The cloud print supporting printer 104 may periodically makes inquiry to the cloud print service 321 and acquire unprinted print data and print capability information corresponding to the print data.

As described above, print data generated based on device capability information updated by the print setting extension application 312 can be transmitted to the cloud print supporting printer 104 via the cloud print service 321.

FIG. 13 is a flowchart showing processing of the OS 313 until the print setting extension application 312 is installed in the client terminal 101. The processing shown in FIG. 13 is implemented by, for example, the CPU 212 of the client terminal 101 reading out a program stored in the storage unit 214 and executing it. The processing shown in FIG. 13 is a flowchart executed by the OS 313.

The CPU 212 displays the screen shown in FIG. 4 and accepts a printer search instruction (step S1201). For example, if the user selects the object 401 in FIG. 4, the CPU 212 accepts a printer search instruction. The processing of step S1201 corresponds to the processing of S302 in FIGS. 3A and 3B.

The CPU 212 determines whether an access token of the cloud print service 321 is stored (step S1202). The client terminal 101 stores an access token for acquiring information from the cloud print service 321 for each user who logs in to the client terminal 101. The CPU 212 determines whether an access token linked with the user who has logged in to the client terminal 101 is stored. Upon determining that the access token is stored, the process advances to step S1206. Upon determining that the access token is not stored, the CPU 212 transmits an authentication request to the cloud print service 321 (step S1203). The CPU 212 then receives, from the cloud print service 321, a URL for displaying a screen to input information necessary for the authentication. The CPU 212 accesses the received URL to display a screen to input information necessary for the authentication (step S1204). The information necessary for the authentication includes, for example, a user ID (user identifier) and a password. The CPU 212 transmits the input information necessary for the authentication to the cloud print service 321, and acquires an access token (step S1205). The processing of step S1205 corresponds to the processing of S305 in FIGS. 3A and 3B. Note that if the authentication in the cloud print service 321 fails, the CPU 212 cannot acquire the access token and ends the processing shown in FIG. 13.

Using the access token, the CPU 212 transmits, to the cloud print service 321, an acquisition request for the information of printers registered in the cloud print service 321 (step S1206). The processing of step S1206 corresponds to the processing of S308 in FIGS. 3A and 3B. The cloud print service 321 acquires the information of printers usable by the user who is identified by the received access token, and transmits the information to the client terminal 101. For example, printer names registered in linkage with the printers usable by the user who is identified by the access token received from the client terminal 101 and the HWIDs of the printers are transmitted to the client terminal 101.

The CPU 212 displays the information of printers acquired from the cloud print service 321 on the display unit 216 of the client terminal 101 (step S1207). By the display in step S1207, the pieces of information of printers are displayed in a list in the region 402 shown in FIG. 4.

The CPU 212 determines whether the information of a printer is selected in the region 402 (step S1208). The CPU 212 repeats the processing of step S1208 until the information of a printer is selected. If the information of a printer is selected, the process advances to step S1209.

The CPU 212 transmits, to the cloud print service 321, an acquisition request for the capability information of the printer selected in the region 402 (step S1209). The processing of step S1209 corresponds to the processing of S310 in FIGS. 3A and 3B. Here, inquiry is performed for the cloud print service 321 concerning setting items registered in the OS 313 in advance.

The CPU 212 updates the device capability information of the printer stored in the client terminal 101 based on the capability information acquired from the cloud print service 321, and generates a print queue (step S1210). The processing of step S1210 corresponds to the processing of S312 in FIGS. 3A and 3B.

The CPU 212 transmits an acquisition request for an extension setup information file to the online support service 351 (step S1211). The acquisition request includes the HWID of the printer.

The CPU 212 determines whether the acquisition of the extension setup information file succeeds (step S1212). Upon determining that the acquisition of the extension setup information file succeeds, the process advances to step S1213. Upon determining that the acquisition of the extension setup information file fails, the processing shown in FIG. 12 is ended.

The CPU 212 transmits, to the application management service 331, an acquisition request for a print setting extension application described in the acquired extension setup information file (step S1213). The processing of step S1213 corresponds to the processing of S318 in FIGS. 3A and 3B. The CPU 212 acquires the application identifier of the print setting extension application from the extension setup information file, designates the acquired application identifier, and transmits an acquisition request for the print setting extension application to the application management service 331.

The CPU 212 determines whether the acquisition of the print setting extension application succeeds (step S1214). Upon determining that the acquisition of the print setting extension application fails, the processing shown in FIG. 12 is ended. Upon determining that the acquisition of the print setting extension application succeeds, the process advances to step S1215.

The CPU 212 installs the acquired print setting extension application and registers the application identifier of the print setting extension application in linkage with the print queue (step S1215). The processing of step S1215 corresponds to the processing of S320 in FIGS. 3A and 3B. Furthermore, the CPU 212 registers, in the OS 313, an event representing the timing of notification. Here, the CPU 212 performs registration such that the print setting extension application 312 is notified of an event if the print queue linked with the print setting extension application is selected in the print setting screen displayed by the print application 315.

Figure 14:
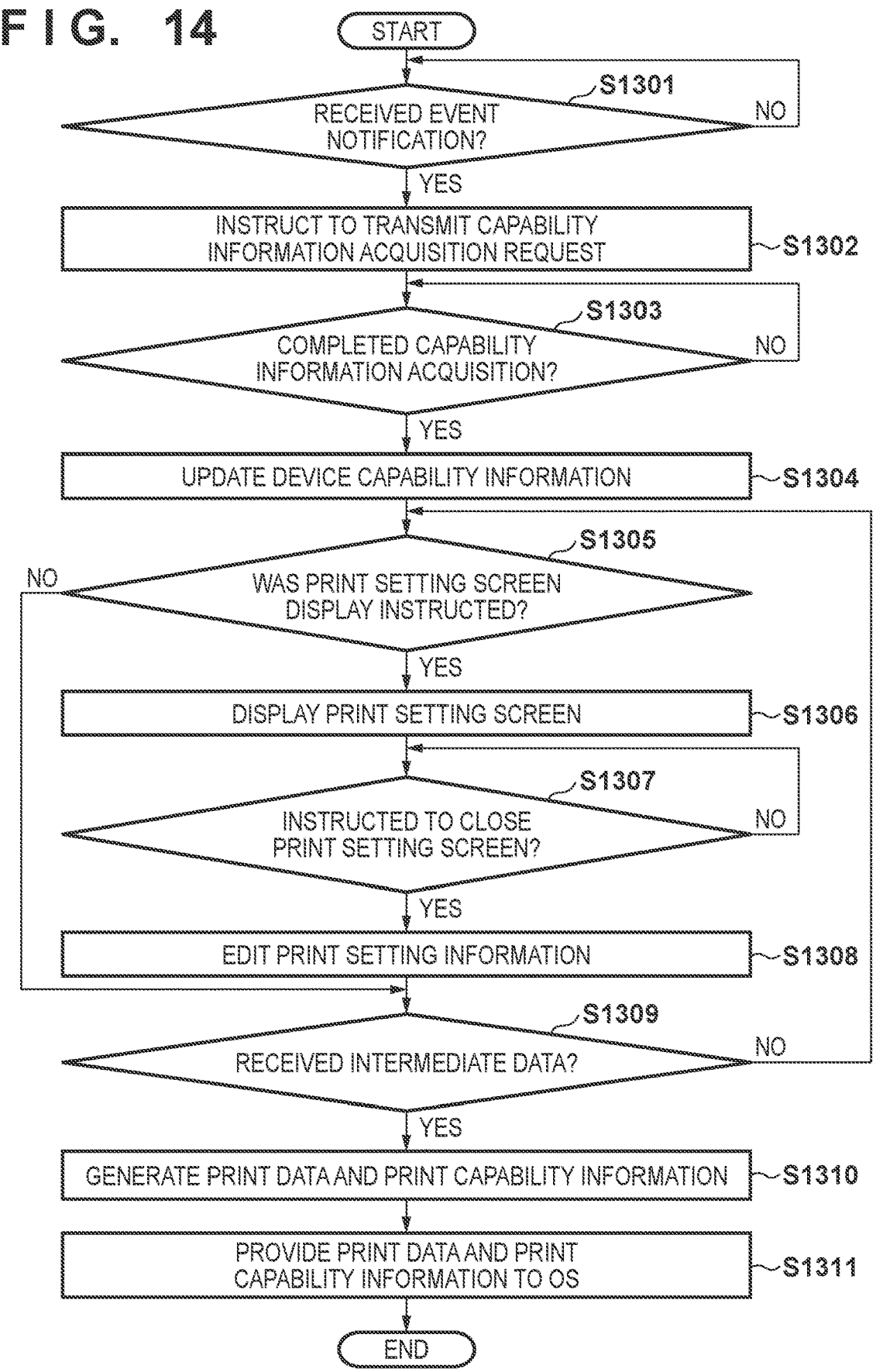
FIG. 14 is a flowchart showing processing of the print setting extension application.

Next, processing of doing print settings and generating print data, which is executed by the installed print setting extension application 312, will be described with reference to FIG. 14. The processing shown in FIG. 14 is implemented by, for example, the CPU 212 of the client terminal 101 reading out a program stored in the storage unit 214 and executing it. The processing shown in FIG. 14 is a flowchart executed by the print setting extension application 312.

The CPU 212 determines whether an event notification is received (step S1301). The event is an event issued by the OS 313, and the event is notified to the print setting extension application 312 at the timing registered in step S1215 of FIG. 13. Upon determining that the event notification is not received, the CPU 212 repeats the processing of step S1301. Upon determining that the event notification is received, the process advances to step S1302.

The CPU 212 transmits an acquisition request for capability information to the cloud print service 321 (step S1302). Concerning setting items set in the print setting extension application 312, the CPU 212 transmits the acquisition request for capability information to the cloud print service 321. Here, capability information for setting items that cannot be acquired in step S1207 of FIG. 13 is acquired. The processing of step S1302 corresponds to the processing of S806 in FIGS. 9A and 9B.

The CPU 212 determines whether the acquisition of capability information is completed (step S1303). Upon determining that the acquisition of capability information is not completed, the CPU 212 repeats the processing of step S1303. Upon determining that the acquisition of capability information is completed, the process advances to step S1304.

The CPU 212 updates the device capability information by the acquired capability information (step S1304). By performing the processing of step S1304, capability information for the setting items that are not acquired by the OS 313 can be stored in the client terminal 101. The processing of step S1304 corresponds to the processing of S808 and S809 in FIGS. 9A and 9B.

The CPU 212 determines whether a display instruction from the user for the print setting screen by the print setting extension application 312 is accepted (step S1305). The display instruction for the print setting screen by the print setting extension application 312 is, for example, an instruction issued based on a user selection operation of the object 1110 in FIG. 12. Upon determining that the display instruction for the print setting screen is not accepted, the process advances to step S1309. Upon determining that the display instruction for the print setting screen is accepted, the process advances to step S1306.

The CPU 212 displays the print setting screen shown in FIG. 11A based on the device capability information updated in step S1304 (step S1306). The CPU 212 accepts a user operation for selecting a set value via the displayed print setting screen.

The CPU 212 determines whether an instruction for ending the display of the print setting screen by the print setting extension application 312 is accepted (step S1307). Upon determining that the instruction for ending the display of the print setting screen is not accepted, the CPU 212 repeats the processing of step S1307. Upon determining that the instruction for ending the display of the print setting screen is accepted, the process advances to step S1308.

The CPU 212 edits the print setting information by the set value selected in the print setting screen by the print setting extension application 312 (step S1308). The CPU 212 then ends the display of the print setting screen by the print setting extension application 312. The processing of step S1308 corresponds to the processing of S815 in FIGS. 9A and 9B.

The CPU 212 determines whether the print setting extension application 312 receives intermediate data from the OS 313 (step S1309). Upon determining that the intermediate data is not received, the CPU 212 repeats the processing from step S1305. Upon determining that the intermediate data is received, the process advances to step S1310. The intermediate data is, for example, XPS data. Note that the print setting information may be included in the intermediate data.

The CPU 212 generates print data based on the intermediate data received by the print setting extension application 312, and generates print capability information based on the print setting information received by the print setting extension application 312 (step S1310). The processing of step S1310 corresponds to the processing of S820 in FIGS. 9A and 9B. The CPU 212 generates print data of a predetermined format, for example, PDL data, like a PDL file, based on the intermediate data. Also, the CPU 212 generates print capability information described by the attribute values defined by the IPP based on the print setting information. In the print capability information, values can freely be described in addition to the attribute values defined by the IPP. Hence, concerning the setting items and the attribute values uniquely defined by the printer vendor, the CPU 212 can describe the values as the print capability information.

The CPU 212 provides the generated print data to the OS 313 (step S1311). The processing of step S1311 corresponds to the processing of S821 in FIGS. 9A and 9B. The OS 313 transmits the print data and the print capability information received via the print queue to the cloud print service 321.

Figure 15:
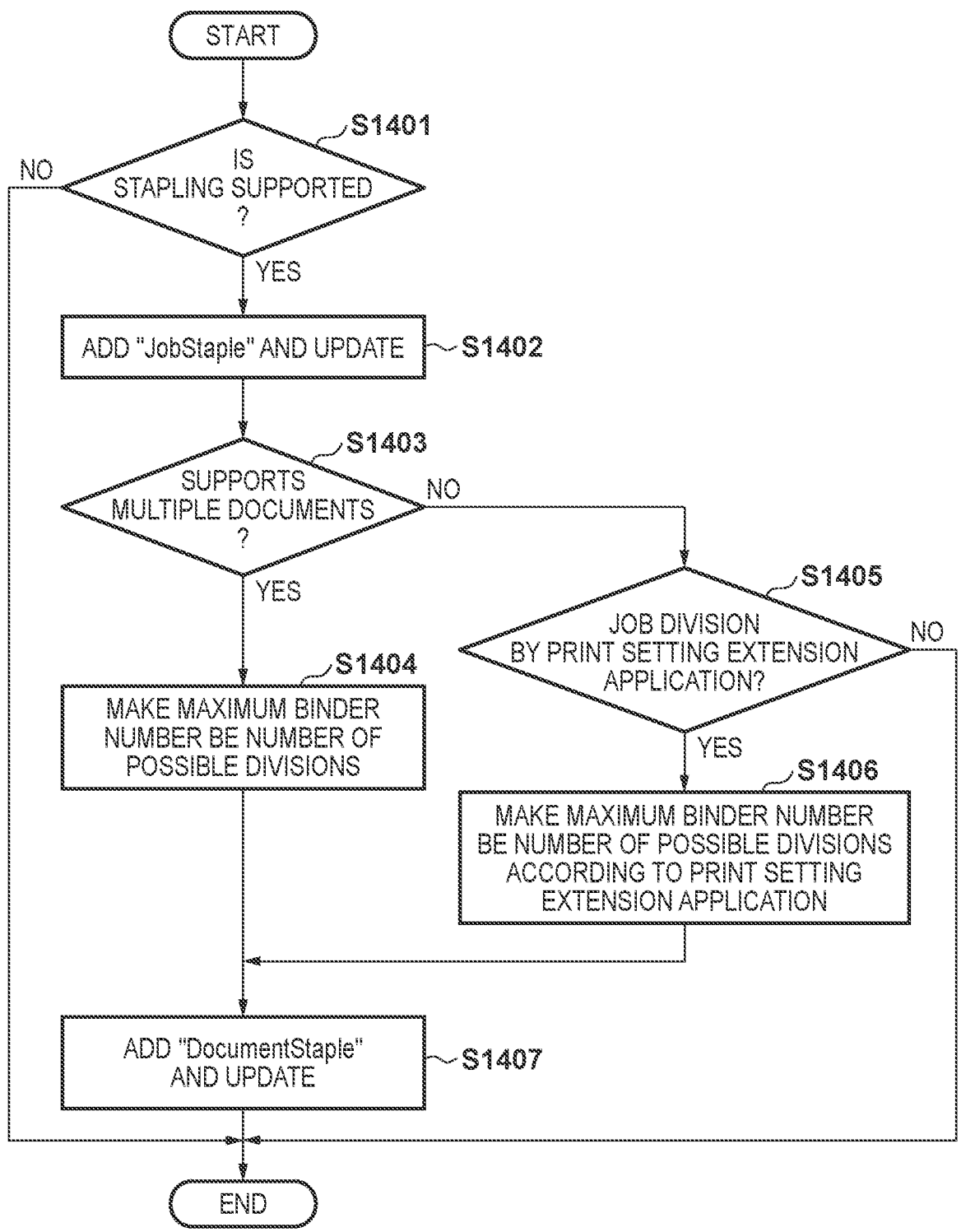
FIG. 15 is a flowchart showing processing of the print setting extension application.

Details of the processing of updating the device capability information in step S1304 of FIG. 14 will be described with reference to FIG. 15. The processing shown in FIG. 15 is implemented by, for example, the CPU 212 of the client terminal 101 reading out a program stored in the storage unit 214 and executing it. The processing shown in FIG. 15 is a flowchart executed by the print setting extension application 312. Note that details of processing of updating device capability information associated with a staple function will be described below as an example.

The CPU 212 refers to the item of staple in the capability information acquired in step S1302 of FIG. 14 and determines whether a staple function exists (step S1401). Upon determining that a staple function exists, the process advances to step S1402. Upon determining that a staple function does not exist, the processing shown in FIG. 15 is ended.

Upon determining that a staple function exists, in addition to an acquired attribute value, the CPU 212 adds the staple function for the whole job to the device capability information to update it (step S1402). For example, as shown in FIGS. 7A to 7D, "psk:JobStapleAllDocuments" is described, and psk:StapleTopLeft that is a position to staple is described as a settable value.

The CPU 212 refers to the item of multiple document handling in the capability information acquired in step S1302, and determines whether finishing such as staple on a document basis is possible (step S1403). Upon determining that finishing on a document basis is possible, the process advances to step S1404. Upon determining that finishing on a document basis is not possible, the process advances to step S1405.

Upon determining that finishing on a document basis is possible, the CPU 212 refers to item of the maximum number of document divisions in the capability information acquired in step S1302, and adds and updates a multi-binder number in the device capability information (step S1404). For example, as shown in FIGS. 7A to 7D, "ns0000:MultiBinderNumber" is described, and a minimum value "1" and a maximum number (for example, 50) are described.

If a plurality of documents exist in the job, and it is determined that finishing such as staple on a document basis is not possible, the CPU 212 determines whether to divide the job by the print setting extension application 312 (step S1405). Here, whether to divide the job may be decided, for example, uniquely for each model, or may be set by the user. Upon determining to divide the job by the print setting extension application 312, the process advances to step S1406. Upon determining not to divide the job by the print setting extension application 312, the processing shown in FIG. 15 is ended.

Upon determining to divide the job by the print setting extension application 312, the CPU 212 sets the number of jobs that the print setting extension application 312 can divide to the maximum value of multi-binder, and adds and updates the multi-binder number in the device capability information (step S1406). For example, as shown in FIGS. 7A to 7D, "ns0000:MultiBinderNumber" is described, and a minimum value "1" and a maximum number are described. For example, if the print setting extension application 312 can divide a job into 100 jobs, 100 is described as the maximum number.

After steps S1404 and S1406, in addition to an acquired attribute value, the CPU 212 adds the staple function on a document basis to the device capability information to update it (step S1407). For example, as shown in FIGS. 7A to 7D, "psk:DocumentStaple" is described, and psk:StapleTopLeft that is a position to staple is described as a settable value. After step S1407, the processing shown in FIG. 15 is ended.

Figure 16:
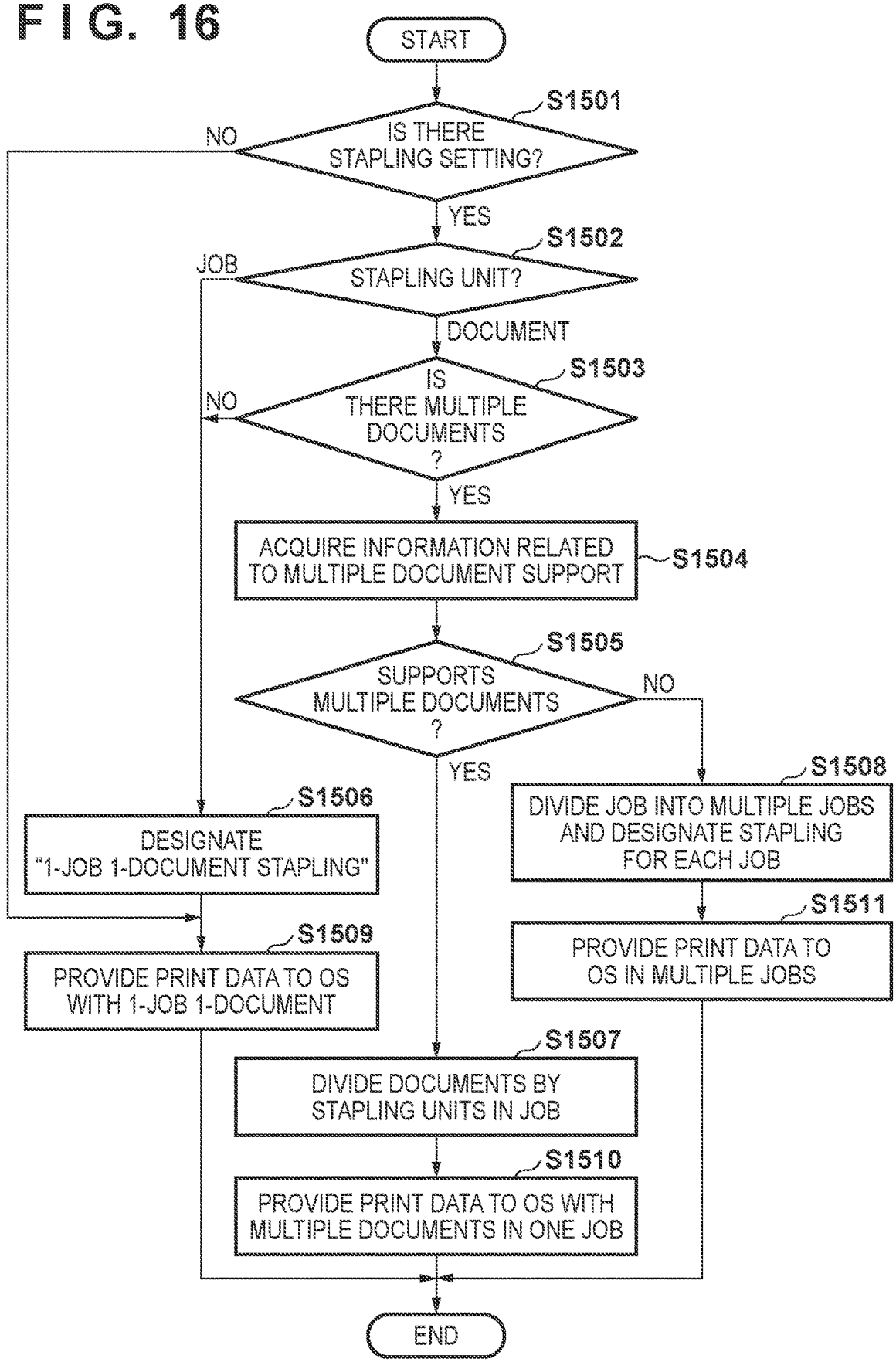
FIG. 16 is a flowchart showing processing of the print setting extension application.

Details of the print data generation processing in steps S1310 and S1311 of FIG. 14 will be described with reference to FIG. 16. The processing shown in FIG. 16 is implemented by, for example, the CPU 212 of the client terminal 101 reading out a program stored in the storage unit 214 and executing it. The processing shown in FIG. 16 is a flowchart executed by the print setting extension application 312. Note that details of print data generation processing associated with a staple function will be described below as an example.

The CPU 212 refers to the print setting information and determines whether a staple setting exists (step S1501). Upon determining that a staple setting does not exist, the process advances to step S1509. Upon determining that a staple setting exists, the process advances to step S1502.

Upon determining that a staple setting exists, the CPU 212 refers to the print setting information and determines whether the unit of staple is whole job or document basis (step S1502). Upon determining that the unit of staple is whole job, the process advances to step S1506. Upon determining that the unit of staple is document basis, the process advances to step S1503.

Upon determining that the unit of staple is document basis, the CPU 212 refers to the intermediate data and determines whether a plurality of documents exist in the job (step S1503). Upon determining that a plurality of documents exist, the process advances to step S1504. Upon determining that a plurality of documents do not exist, the process advances to step S1506.

Upon determining that a plurality of documents exist, the CPU 212 refers to the capability information acquired in step S1302 and acquires information representing whether the printer can handle a plurality of documents for each job (step S1504). The CPU 212 refers to the information acquired in step S1504 and determines whether the printer can handle a plurality of documents (step S1505). Upon determining that the printer can handle a plurality of documents for each job, the process advances to step S1507. Upon determining that the printer cannot handle a plurality of documents for each job, the process advances to step S1508.

In step S1506, the CPU 212 generates print data in a format of 1-job 1-document, and based on the print setting information, generates print capability information described by attribute values defined by the IPP such that staple is performed. In step S1509, the CPU 212 provides, to the OS 313, the print data including a staple setting as the print capability information and including one document. In step S1509, for example, if the method of providing the print data to the OS 313 complies with the IPP, the CPU 212 generates the print capability information including the staple setting by Create-Job Request. After that, the CPU 212 provides print data generated from the intermediate data to the OS 313 by Send-Document. After step S1509, the processing shown in FIG. 16 is ended.

In step S1507, the CPU 212 generates print data in a format of 1-job multiple-document, and based on the print setting information, generates print capability information described by attribute values defined by the IPP such that staple is performed. In step S1510, the CPU 212 provides, to the OS 313, the print data including a staple setting as the print capability information and including a plurality of documents existing in one job. In step S1510, for example, if the method of providing the print data to the OS 313 complies with the IPP, the CPU 212 generates the print capability information including the staple setting on a document basis by Create-Job Request. After that, the CPU 212 repeats Send-Document as many times as the number of divisions, thereby providing the print data generated from the intermediate data to the OS 313. After step S1510, the processing shown in FIG. 16 is ended.

In step S1508, the CPU 212 divides the job for each document to generate print data in a format of each job 1-document, and generates print capability information described by attribute values defined by the IPP such that staple is performed in each job. In step S1511, the CPU 212 provides, to the OS 313, the print data including a staple setting as the print capability information and including one document existing in one job. In step S1511, for example, if the method of providing the print data to the OS 313 complies with the IPP, the CPU 212 generates the print capability information including the staple setting on a document basis by Create-Job Request. After that, the CPU 212 repeats the processing from Create-Job Request of job generation to Send-Document of document transmission as many times as the number of divisions, thereby providing the print data to the OS 313. After step S1511, the processing shown in FIG. 16 is ended.

As described above, according to this embodiment, when selecting the print queue linked with the standard driver mounted on the OS in advance and transmitting print data and print capability information to the cloud print service, print setting information unique to a printer vendor can be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-169398, filed Oct. 21, 2022, which is hereby incorporated by reference herein in its entirety.

What is claimed is:

1. An information processing apparatus, comprising:
one or more memories configured to store an application configured to extend a function of a driver supporting a cloud print service; and
one or more processors configured to execute the application stored in the one or more memories to implement:
a first acquisition unit configured to acquire capability information of a printer corresponding to the driver from the cloud print service if printing via the driver is performed;
a display unit configured to display a setting screen corresponding to the capability information based on the capability information acquired by the first acquisition unit;

a second acquisition unit configured to acquire intermediate data generated by software different from the application configured to extend the function of the driver supporting the cloud print service, the intermediate data having been generated based on setting information of the displayed setting screen corresponding to the capability information of the printer corresponding to the driver from the cloud print service; and a conversion unit configured to convert the intermediate data, generated based on the setting information of the displayed setting screen corresponding to the capability information of the printer corresponding to the driver from the cloud print service, acquired by the second acquisition unit into data to be transmitted to the cloud print service.

2. The apparatus according to claim 1, wherein the one or more processors are configured to execute the application stored in the one or more memories to further implement a providing unit configured to provide the setting information to the software, wherein the second acquisition unit acquires the intermediate data generated by the software based on the setting information provided by the providing unit.

3. The apparatus according to claim 1, wherein the data to be transmitted to the cloud print service includes print data and print capability information.

4. The apparatus according to claim 3, wherein the print data is PDL data.

5. The apparatus according to claim 3, wherein the print capability information is information in which the setting information is described by an attribute value defined by Internet printing protocol (IPP).

6. The apparatus according to claim 1, wherein the software different from the application is a print application.

7. The apparatus according to claim 6, wherein the second acquisition unit acquires, via an operating system, the intermediate data generated by the print application.

8. The apparatus according to claim 1, wherein the software different from the application is an operating system, and the operating system holds definition information necessary for generating print setting information of the driver, the first acquisition unit acquires the capability information of the printer corresponding to the driver from the cloud print service based on a first notification from the operating system, and the first notification is performed based on selection of the driver.

9. The apparatus according to claim 8, wherein the one or more processors are configured to execute the application stored in the one or more memories to further implement an updating unit configured to update the definition information based on the capability information acquired by the first acquisition unit.

10. The apparatus according to claim 9, wherein the capability information acquired by the first acquisition unit includes information representing whether staple on a document basis in a job is possible.

11. The apparatus according to claim 10, wherein the updating unit updates the definition information concerning a binder number based on the information representing whether staple on a document basis in the job is possible.

12. The apparatus according to claim 10, wherein the data to be transmitted to the cloud print service includes print data and print capability information, and the conversion unit converts, based on the information representing whether staple on a document basis in the job is possible, the intermediate data acquired by the second acquisition unit into the print data in which a job and a document are associated.

13. The apparatus according to claim 9, wherein the display unit displays the setting screen based on a second notification from the operating system.

14. The apparatus according to claim 13, wherein the second notification is performed based on acceptance of an instruction for displaying a screen to do an advanced setting in a print setting screen displayed by a print application different from the application.

15. The apparatus according to claim 14, wherein the print setting screen is displayed based on the definition information updated by the updating unit.

16. The apparatus according to claim 1, wherein the driver is a standard driver mounted on an operating system in advance.

17. The apparatus according to claim 1, wherein the one or more processors are configured to execute the application stored in the one or more memories to further implement a unit configured to transfer, to an operating system, the data to be transmitted to the cloud print service, which is converted by the conversion unit.

18. A method executed in an information processing apparatus comprising an application configured to extend a function of a driver supporting a cloud print service, comprising:

in the application, acquiring capability information of a printer corresponding to the driver from the cloud print service if printing via the driver is performed;

displaying a setting screen corresponding to the capability information based on the acquired capability information;

acquiring intermediate data generated by software different from the application configured to extend the function of the driver supporting the cloud print service, the intermediate data having been generated based on setting information of the displayed setting screen corresponding to the capability information of the printer corresponding to the driver from the cloud print service; and converting the acquired intermediate data, generated based on the setting information of the displayed setting screen corresponding to the capability information of the printer corresponding to the driver from the cloud print service, into data to be transmitted to the cloud print service.

19. A non-transitory computer-readable storage medium storing an application configured to extend a function of a driver supporting a cloud print service, the application, when executed by a computer, being configured to cause the computer to:

acquire capability information of a printer corresponding to the driver from the cloud print service if printing via the driver is performed;

display a setting screen corresponding to the capability information based on the acquired capability information;

acquire intermediate data generated by software different from the application configured to extend the function of the driver supporting the cloud print service, the intermediate data having been generated based on setting information of the displayed setting screen corresponding to the capability information of the printer corresponding to the driver from the cloud print service; and convert the acquired intermediate data, generated based on the setting information of the displayed setting screen corresponding to the capability information of the printer corresponding to the driver from the cloud print service, into data to be transmitted to the cloud print service.

* * * * *